(12) United States Patent
Harrison et al.

(10) Patent No.: US 10,829,312 B2
(45) Date of Patent: Nov. 10, 2020

(54) AUTONOMOUS TENSIONER SYSTEMS FOR CONVEYOR BELT SCRAPERS AND METHODS FOR DETERMINING A USEFUL LIFE OF THE SAME

(71) Applicant: Martin Engineering Company, Neponset, IL (US)

(72) Inventors: Paul B. Harrison, Kewanee, IL (US); Andrew Timmerman, Geneseo, IL (US)

(73) Assignee: MARTIN ENGINEERING COMPANY, Neponset, IL (US)

( * ) Notice: Subject to any disclaimer, the term of this patent is extended or adjusted under 35 U.S.C. 154(b) by 0 days.

(21) Appl. No.: 16/530,114

(22) Filed: Aug. 2, 2019

(65) Prior Publication Data

US 2020/0048011 A1    Feb. 13, 2020

Related U.S. Application Data

(60) Provisional application No. 62/715,997, filed on Aug. 8, 2018.

(51) Int. Cl.
  *B65G 45/16*    (2006.01)
(52) U.S. Cl.
  CPC .................. *B65G 45/16* (2013.01)
(58) Field of Classification Search
  CPC ............................ B65G 45/16; B65G 45/14
  (Continued)

(56) References Cited

U.S. PATENT DOCUMENTS 4,969,553 A * 11/1990 Stoll ..................... B65G 45/16
                                                        198/499
5,950,803 A    9/1999 Schwarze
(Continued)

FOREIGN PATENT DOCUMENTS

CN    202642774 U    1/2013
CN    204872691 U    12/2015
(Continued)

OTHER PUBLICATIONS

Automated Tensioner for Conveyor Belt Cleaners; Bulk Solids (The Source for Dry Processing and Bulk Handling Technology); Apr. 7, 2017; 3 pgs.

*Primary Examiner* — Mark A Deuble
(74) *Attorney, Agent, or Firm* — Dinsmore & Shohl LLP

(57) ABSTRACT

An autonomous tensioner system that is coupled to a conveyor belt scraper includes a motor that generates a first drive torque and a gearing assembly coupled to the motor such that the gearing assembly is actuated in response to the motor generating the first drive torque. The gearing assembly generates a second drive torque in response to receiving the initial drive torque generated by the motor and the second drive torque is greater than the first drive torque. The autonomous tensioner system includes an output member coupled to the gearing assembly and the conveyor belt scraper. The output member receives the second drive torque from the gearing assembly and rotates in response, thereby generating a rotational torque. The conveyor belt scraper receives the rotational torque from the output member and simultaneously moves at a torque greater than the first drive torque generated by the motor.

17 Claims, 10 Drawing Sheets

(58) Field of Classification Search
USPC .................................................. 198/498–499
See application file for complete search history.

(56) References Cited

U.S. PATENT DOCUMENTS

| | | | |
|---|---|---|---|
| 6,003,657 A | 12/1999 | Mott | |
| 6,283,274 B1 | 9/2001 | Dolan et al. | |
| 6,554,734 B1 * | 4/2003 | Maydew | B64C 13/34 |
| | | | 475/248 |
| 6,986,418 B2 * | 1/2006 | Swinderman | B65G 45/12 |
| | | | 198/497 |
| 7,051,862 B1 * | 5/2006 | Smith | B65G 45/16 |
| | | | 198/497 |
| 2012/0031736 A1 * | 2/2012 | Swinderman | B65G 43/02 |
| | | | 198/498 |
| 2017/0174441 A1 * | 6/2017 | Strathaus | B65G 45/16 |
| 2018/0287450 A1 * | 10/2018 | Alfano | H02K 5/10 |
| 2019/0193946 A1 * | 6/2019 | DeVries | B65G 45/12 |

FOREIGN PATENT DOCUMENTS

| | | | | |
|---|---|---|---|---|
| CN | 107265089 A | 10/2017 | | |
| WO | 9804898 A1 | 2/1998 | | |
| WO | WO-2017108150 A1 * | 6/2017 | ............. | B65G 45/12 |

* cited by examiner

AUTONOMOUS TENSIONER SYSTEMS FOR CONVEYOR BELT SCRAPERS AND METHODS FOR DETERMINING A USEFUL LIFE OF THE SAME

CROSS-REFERENCE TO RELATED APPLICATIONS

This application claims the benefit of U.S. Provisional Patent Application No. 62/715,997, filed Aug. 8, 2018 and entitled "Automatic Tensioner for Bulk Material Conveyor Belt Scrapers."

TECHNICAL FIELD

The present specification generally relates to autonomous systems for maintaining effective contact between a conveyor belt scraper and a conveyor belt, and more specifically, to self-adjusting devices that dynamically apply rotational tension to conveyor belt scrapers for purposes of effectively cleaning a conveyor belt of bulk material transported thereon.

BACKGROUND

Conveyor belts designed to transfer bulk quantities of non-packaged materials, such as, for example, ore or grain, generally include conveyor belt scrapers coupled thereto for cleaning the conveyor belt of said materials. In particular, conveyor belt scrapers are generally positioned at a terminal-end of a conveyor belt where the bulk materials are offloaded from the conveyor belt. Conveyor belt scrapers serve to reduce a carryback amount of the bulk materials on a return run of the conveyor belt (i.e., a portion of the conveyor belt traveling from a terminal-end of the travel run to a commencement-end). Conveyor belt scrapers are generally biased against a conveyor belt to scrape any bulk materials that are maintained along the conveyor belt after reaching a terminal-end of the travel run.

Conveyor belt scrapers may generally wear from prolonged use due to an abrasion of the scraper blade against the conveyor belt and/or the bulk materials carried thereon. To maintain effective contact against the conveyor belt, a position (i.e., orientation) of the scraper blade may require constant manual adjustment to preserve proper functionality of the conveyor belt scraper or else a distance (i.e., a gap) between the conveyor belt and the conveyor belt scraper is formed. In this instance, portions of bulk material may pass through the gap and be maintained on the conveyor belt during a return run. Requiring constant manual adjustment of conveyor belt scrapers may be labor-intensive, time consuming, and costly. Further, progressively monitoring a wear and/or abrasion of a scraper blade to properly identify when manual adjustment and/or replacement of a conveyor belt scraper are needed may further require additional time, labor and costs.

Accordingly, a need exists for a system that autonomously determines an extent of wear of a conveyor belt scraper and automatically adjusts a physical position of the scraper blade in response, and methods incorporating the same.

SUMMARY

In one embodiment, an autonomous tensioner system coupled to a conveyor belt scraper includes a motor that generates a first drive torque and a gearing assembly coupled to the motor such that the gearing assembly is actuated in response to the motor generating the first drive torque. The gearing assembly generates a second drive torque in response to receiving the initial drive torque generated by the motor and the second drive torque is greater than the first drive torque. The autonomous tensioner system includes an output member coupled to the gearing assembly and the conveyor belt scraper. The output member receives the second drive torque from the gearing assembly and rotates in response, thereby generating a rotational torque. The conveyor belt scraper receives the rotational torque from the output member and simultaneously moves at a torque greater than the first drive torque generated by the motor.

In another embodiment, an autonomous tensioner for a conveyor belt scraper coupled to a conveyor belt includes a sensor that detects a load applied to the conveyor belt scraper by the conveyor belt and an electric motor that outputs a drive torque when the sensor detects the load applied to the conveyor belt scraper is below a predetermined value. The autonomous tensioner includes a gearing assembly coupled to the electric motor such that the gearing assembly receives the drive torque from the electric motor. The gearing assembly outputs a rotational torque that is greater than the drive torque output by the electric motor. The autonomous tensioner further includes an output member rotatably coupled to the gearing assembly such that the output member receives the rotational torque from the gearing assembly. The output member outputs the rotational torque to the conveyor belt scraper, thereby causing the conveyor belt scraper to move at a torque greater than the drive torque output by the electric motor.

In another embodiment, a method of autonomously applying torsion to a conveyor belt scraper with a tensioner system with the conveyor belt scraper is coupled to a conveyor belt. The method includes detecting a load applied to the conveyor belt scraper from the conveyor belt with a sensor of the tensioner system, determining whether the load is equal to a predetermined load value, and activating a motor of the tensioner system coupled to the conveyor belt scraper to move the conveyor belt scraper toward the conveyor belt when the load is not equal to the predetermined load value. The method further includes deactivating the motor to cease movement of the conveyor belt scraper toward the conveyor belt when the load is equal to the predetermined load value, and repeating the steps above at a predetermined interval.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to methods and systems for including an autonomous tensioner system with a conveyor belt scraper that is coupled to a conveyor belt assembly. The autonomous tensioner system is generally configured to generate a torsional biasing force onto a conveyor belt scraper to thereby bias a scraper blade of the conveyor belt scraper against a conveyor belt. The autonomous tensioner system includes a motor that generates a first drive torque and a gearing assembly that is coupled to the motor such that the gearing assembly is actuated in response to the motor generating the first drive torque. The gearing assembly further generates a second drive torque in response to receiving the first drive torque from the motor. The second drive torque generated by the gearing assembly is relatively greater than the first drive torque generated by the motor and received at the gearing assembly. The autonomous tensioner system further includes an output member that is coupled to the gearing assembly and is further coupled to the conveyor belt scraper. The output member is configured to receive the second drive torque generated by the gearing assembly. In response to receiving the second drive torque from the gearing assembly, the output member is configured to rotate thereby generating a rotational torque. The conveyor belt scraper receives the rotational torque generated by the output member and simultaneously pivots in response at a torque that is relatively greater than the first drive torque generated by the motor.

In the embodiments described herein, the terms "lateral," "longitudinal," "inner," "outer," "distal," "proximal" and "proximate" are used to describe the relative positioning of various components of the system. As used herein, the phrase "periphery" describes one or more components that are positioned and/or extend about one or more other components of the system and the phrase "central" describes one or more components that are positioned relatively within a perimeter of one or more other components of the system described herein.

Figure 1:
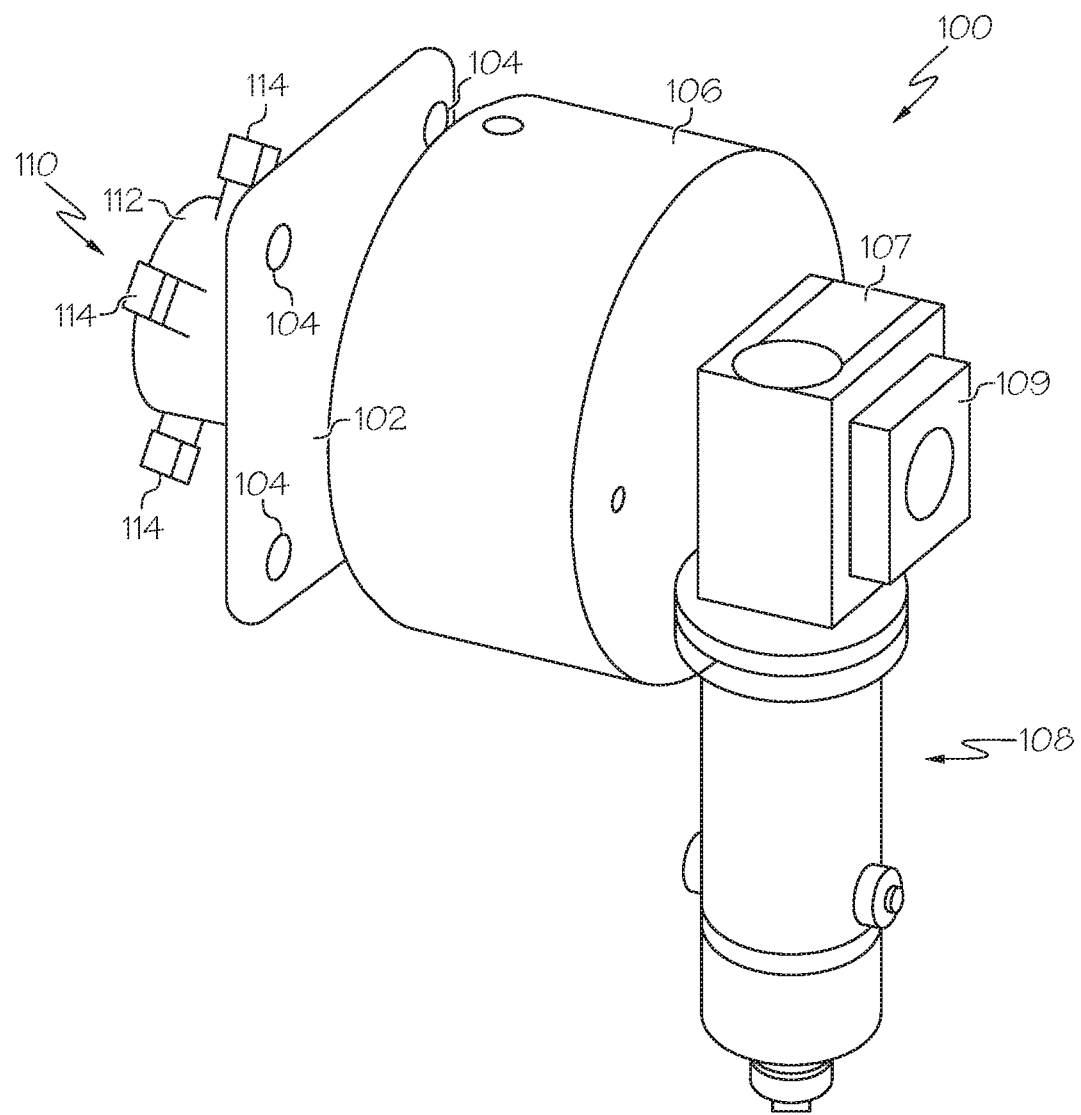
FIG. 1 schematically depicts a perspective view of an illustrative autonomous tensioner system according to one or more embodiments shown and described herein.

Referring initially to FIG. 1, a non-limiting example of an autonomous tensioner system 100 is illustrated. In the illustrated embodiment, the autonomous tensioner system 100 includes a mounting plate 102, a housing 106, and an output member 110. The mounting plate 102 is disposed between the output member 110 and the housing 106 such that the mounting plate 102 is fixedly secured therebetween. More specifically, the mounting plate 102 defines an attachment surface extending between the output member 110 and the housing 106 and is configured to secure the autonomous tensioner system 100 to an object, such as, for example, a conveyor belt assembly 10 (see FIG. 7). In the present example, the mounting plate 102 defines a planar surface that includes one or more apertures 104 disposed therethrough that are sized and shaped to receive a fastener (not shown) for securing the autonomous tensioner system 100 to an object.

The output member 110 of the autonomous tensioner system 100 extends outward from the mounting plate 102 opposite a position of the housing 106. The output member 110 includes an elongated body 112 and a plurality of projections 114 protruding laterally outward from the elongated body 112. In particular, the plurality of projections 114 extends about the elongated body 112 of the output member 110 along an annular-array. The elongated body 112 of the output member 110 is rotatably coupled to the mounting plate 102 such that the output member 110 is configured to rotate relative to the mounting plate 102. In some embodiments, the plurality of projections 114 are resiliently biased to an extended position relative to the elongated body 112 such that the plurality of projections 114 are selectively depressible toward the elongated body 112 in response to an application of force thereon. In other embodiments, the plurality of projections 114 is static and/or rigidly fixed relative to the elongated body 112. As described in greater detail herein, the elongated body 112 of the output member 110 is configured to couple the autonomous tensioner system 100 to a device, such as, for example, a conveyor belt scraper 15 (see FIG. 7), via an engagement of the plurality of projections 114 thereto.

Still referring to FIG. 1, the autonomous tensioner system 100 further includes a motor 108 and an intermediate housing 107. The intermediate housing 107 is positioned between the motor 108 and the housing 106 such that the intermediate housing 107 provides a coupling interface between the housing 106 and the motor 108. More specifically, the intermediate housing 107 provides an interface between the one or more components disposed within the housing 106 and the motor 108 such that the motor 108 is in communication with the one or more components of the housing 106 via the intermediate housing 107. The intermediate housing 107 is secured to an end of the housing 106 opposite a position of the mounting plate 102. The housing 106 is disposed over one or more components of the autonomous tensioner system 100, and in particular, over a gearing assembly 120 and a drive mechanism 150 (see FIG. 2) enclosed therein.

The motor 108 is in further communication with the output member 110 of the autonomous tensioner system 100 via the gearing assembly 120 and the drive mechanism 150 disposed within the housing 106. The motor 108 of the autonomous tensioner system 100 is configured to generate a drive torque, and more specifically as described in greater detail herein, a first drive torque that is transferred to the gearing assembly 120 of the autonomous tensioner system 100. The motor 108 may comprise various suitable devices for generating a drive torque, including, for example, a linear drive motor, a pneumatic actuator, and/or the like. In the present example, the motor 108 comprises a low-power electric motor configured to output a drive torque when energized.

Still referring to FIG. 1, the autonomous tensioner system 100 further includes an electronic control unit 109 communicatively coupled to the motor 108, the output member 110, the gearing assembly 120, and/or the drive mechanism 150. In the present example, the electronic control unit 109 is coupled to the intermediate housing 107 but it should be understood that in other embodiments the electronic control unit 109 may be positioned along various other portions of the autonomous tensioner system 100 without departing from the scope of the present disclosure. In other embodiments, the electronic control unit 109 may located remotely from the autonomous tensioner system 100. As described in greater detail herein, the electronic control unit 109 includes one or more components (see FIG. 6) configured to performs one or more operabilities of the autonomous tensioner system 100 (see FIGS. 8-10).

Figure 2:
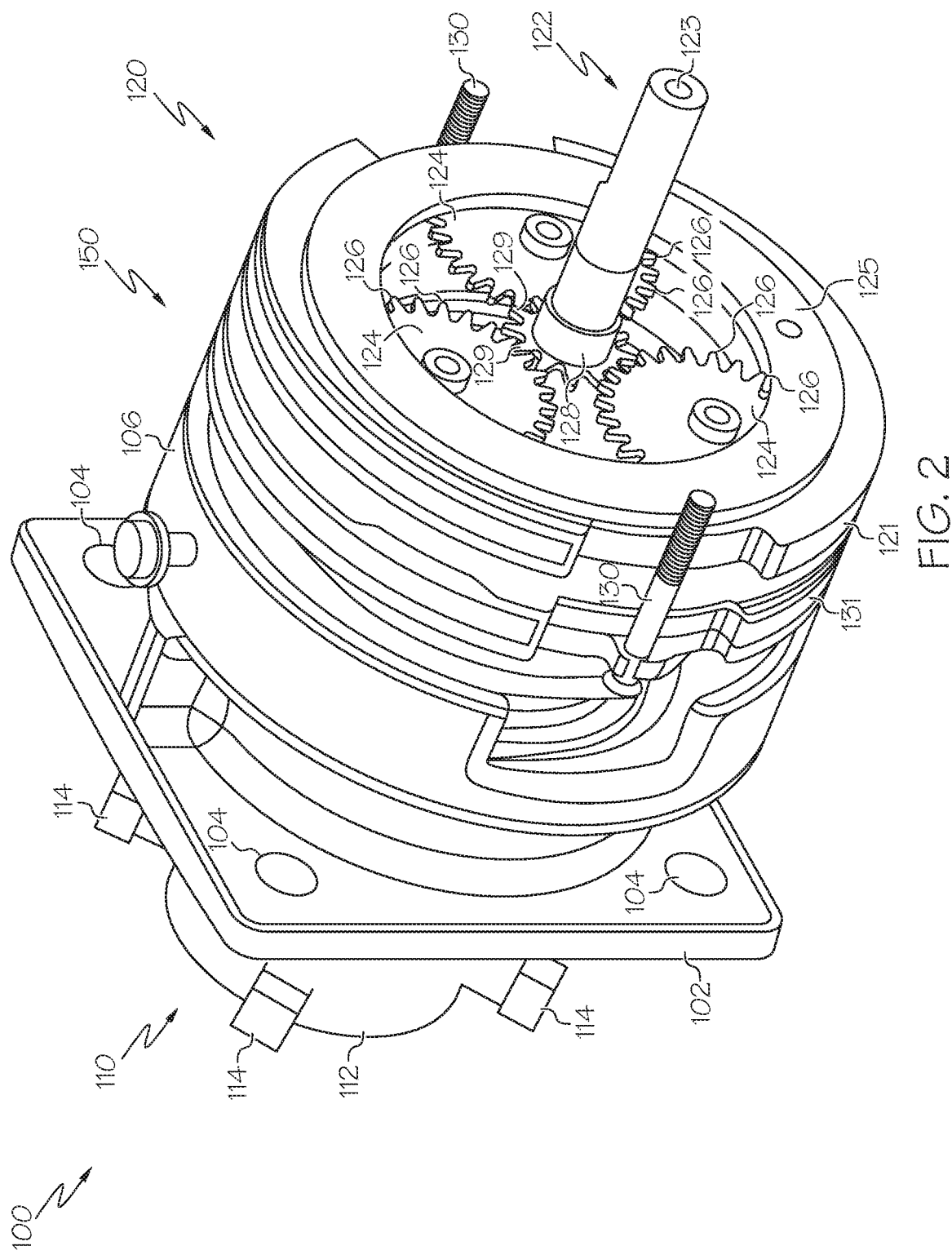
FIG. 2 schematically depicts a partial perspective view of the autonomous tensioner system of FIG. 1 including a gearing assembly and a driving mechanism according to one or more embodiments shown and described herein.

Referring now to FIG. 2, the gearing assembly 120 and the drive mechanism 150 of the autonomous tensioner system 100 is schematically depicted with the intermediate housing 107 and at least a portion of the housing 106 omitted therefrom. The gearing assembly 120 includes a first ring 121 and a second ring 131 coupled to one another by one or more fasteners 130 secured thereto. The first ring 121 and the second ring 131 of the gearing assembly 120 are positioned distally from the mounting plate 102 and the output member 110 relative to the drive mechanism 150, such that the drive mechanism 150 is positioned proximate to the mounting plate 102 and the output member 110 relative to the gearing assembly 120. In other words, the drive mechanism 150 is disposed between the gearing assembly 120 and the mounting plate 102. As described in greater detail herein, the first ring 121 is an input end of the gearing assembly 120 and the second ring 131 is an output end of the gearing assembly 120, such that a drive torque generated by the motor 108 (e.g. a first drive torque) is received by the gearing assembly 120 at the first ring 121 and a modified drive torque (e.g. a second drive torque) is outputted by the gearing assembly 120 via the second ring 131.

The first ring 121 of the gearing assembly 120 includes a plurality of first outer gears 124 disposed within the first ring 121, and more specifically the plurality of first outer gears 124 are rotatably coupled to an interior surface of the first ring 121. Each of the plurality of first outer gears 124 includes a plurality of teeth 126 extending outwardly along a perimeter of the first outer gear 124. In other words, the plurality of teeth 126 of each of the plurality of first outer gears 124 define a toothed-surface extending about an exterior of the first outer gears 124. The first ring 121 of the gearing assembly 120 further includes a first central gear 129 disposed therein. The first central gear 129 is positioned between and coupled to each of the plurality of first outer gears 124. The first central gear 129 comprises a plurality of teeth extending about an exterior surface of the first central gear 129, which are sized and shaped to mesh with the plurality of teeth 126 of each of the plurality of first outer gears 124.

Still referring to FIG. 2, the gearing assembly 120 further includes a drive shaft 122 extending outwardly from the first ring 121. In particular, the drive shaft 122 extends outward from the first ring 121 opposite a position of the second ring 131. The drive shaft 122 of the gearing assembly 120 extends between a distal end 123 and a proximal end 128. An elongated body of the drive shaft 122 extending between the distal end 123 and the proximal end 128 defines a longitudinal length of the drive shaft 122. The proximal end 128 is disposed within the first ring 121 and the distal end 123 extends outward from the first ring 121. The proximal end 128 of the drive shaft 122 is secured to the first central gear 129 of the first ring 121 such that the proximal end 128 is rotatably coupled to the plurality of first outer gears 124 via the corresponding engagement between the plurality of teeth 126 of the first outer gears 124 and the plurality of teeth of the first central gear 129.

With the first central gear 129 securely attached to the proximal end 128 of the drive shaft 122, the drive shaft 122 is configured to rotate the plurality of first outer gears 124 via the first central gear 129 in response to a rotation of the drive shaft 122. The first ring 121 further includes a seal ring 125 disposed along an outer surface of the first ring 121 opposite a position of the second ring 131. The seal ring 125 encloses the plurality of first outer gears 124 positioned within the first ring 121 to thereby inhibit removal and/or displacement of the plurality of first outer gears 124 during a translation and/or rotation of the plurality of first outer gears 124 within the first ring 121. In the present example, the first ring 121 includes three first outer gears 124 engaged to the first central gear 129. It should be understood that the second ring 131 is coupled to the drive mechanism 150 such that the first ring 121 is in communication with the drive mechanism 150 via the second ring 131. Although not shown, it should be understood that the distal end 123 of the drive shaft 122 is received within the intermediate housing 107 and engaged to the motor 108 therein. It should therefore be understood that the motor 108 is coupled to the first ring 121 via the drive shaft 122, and the drive mechanism 150 is in communication with the motor 108 through the gearing assembly 120.

Figure 3:
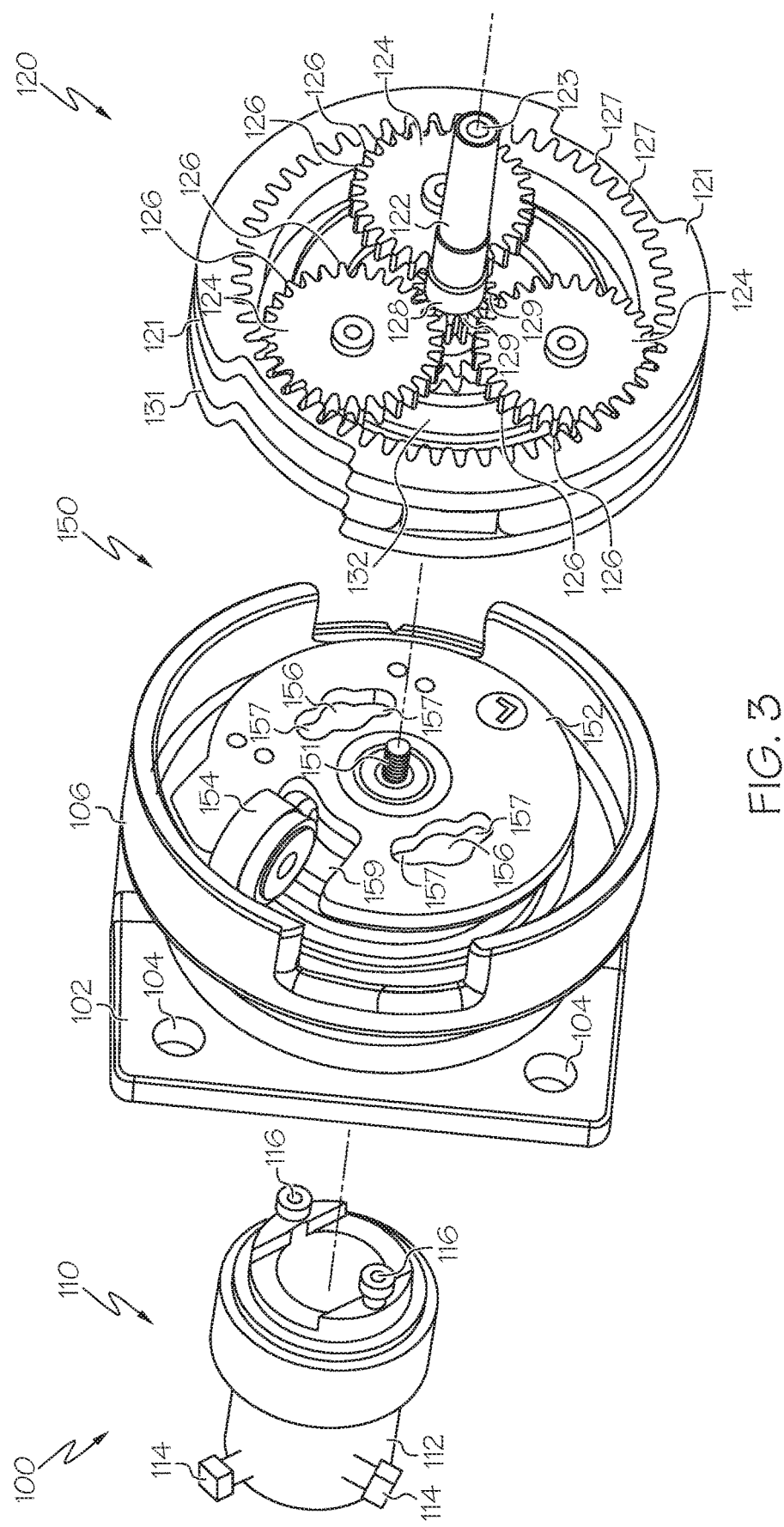
FIG. 3 schematically depicts an exploded, partial perspective view of the autonomous tensioner system of FIG. 1 according to one or more embodiments shown and described herein.

Referring now to FIG. 3, the one or more components of the autonomous tensioner system 100 are schematically depicted in a disassembled state such that the gearing assembly 120 is decoupled from the drive mechanism 150 and the output member 110 is decoupled from the drive mechanism 150. It should be understood that the housing 106 is at least partially omitted such that the gearing assembly 120 and the drive mechanism 150 are exposed therefrom. In the present example, the mounting plate 102 is integrally formed with the drive mechanism 150 such that the mounting plate 102 and the drive mechanism 150 form a unitary structure. However, it should be understood that in other embodiments the mounting plate 102 and the drive mechanism 150 may be separate components such that the mounting plate 102 is configured to disengage the drive mechanism 150. Further, the gearing assembly 120 is schematically depicted and described herein with the seal ring 125 omitted from the first ring 121 such that a first periphery gear 127 of the first ring 121 is exposed.

In particular, the first ring 121 of the gearing assembly 120 includes the first periphery gear 127 formed along an interior surface of the first ring 121. The first periphery gear 127 includes a plurality of teeth extending inwardly along an interior surface of the first ring 121. In other words, the first periphery gear 127 defines a toothed-surface extending inwardly into the first ring 121 toward the plurality of first outer gears 124 positioned therein. Each of the first outer gears 124 is positioned relatively within the first periphery gear 127 and is rotatably coupled to the first periphery gear 127 via an engagement between the plurality of teeth 126 of each of the first outer gears 124 and a plurality of teeth of the first periphery gear 127. The plurality of first outer gears 124 are configured to translate along the first periphery gear 127 of the first ring 121 and rotate within the first ring 121 in response to a rotation of the first central gear 129. As described in detail above, the first periphery gear 127 of the first ring 121 is enclosed by the seal ring 125 (see FIG. 2) such that the seal ring 125 is configured to inhibit the plurality of first outer gears 124 from disengaging the first periphery gear 127.

Still referring to FIG. 3, the gearing assembly 120 further includes a central gear carrier 132 disposed between the first ring 121 and the second ring 131. The central gear carrier 132 is securely coupled to the plurality of first outer gears 124 such that the central gear carrier 132 is configured to rotate relative to the first ring 121 and the second ring 131 in response to a translation and rotation of the plurality of first outer gears 124 within the first ring 121. In some embodiments, the central gear carrier 132 is further coupled to the first central gear 129 of the first ring 121 such that the central gear carrier 132 is configured to rotate in response to a rotation of the first central gear 129. The drive mechanism 150 of the autonomous tensioner system 100 includes a rotatable drive plate 152 that is rotatably coupled about a central fastener 151 of the drive mechanism 150. In this instance, the rotatable drive plate 152 of the drive mechanism 150 is rotatable relative to the housing 106 and the mounting plate 102. The central fastener 151 of the drive mechanism 150 is rotatably fixed relative to the rotatable drive plate 152, and is configured to secure the rotatable drive plate 152 of the drive mechanism 150 to the gearing assembly 120.

The drive mechanism 150 further includes one or more slot openings 156 formed on and extending through the rotatable drive plate 152 such that the slot openings 156 rotate about the central fastener 151 simultaneously with the rotatable drive plate 152. The rotatable drive plate 152 of the drive mechanism 150 further includes a pair of slip openings 157 disposed about each of the slot openings 156. The pair of slip openings 157 is positioned along opposing ends of each of the slot openings 156, and are sized and shaped relatively smaller than the slot openings 156. The output member 110 of the autonomous tensioner system 100 includes one or more output fasteners 116 extending proximally outward from the elongated body 112. The output fasteners 116 of the output member 110 are sized and shaped to extend through apertures formed through the mounting plate 102 (not shown) and into the slot openings 156 of the rotatable drive plate 152. In this instance, the output fasteners 116 are configured to securely engage the output member 110 to the drive mechanism 150.

Still referring to FIG. 3, the one or more slot openings 156 of the rotatable drive plate 152 are sized and shaped to receive the one or more output fasteners 116 of the output member 110 therethrough. In this instance, the output member 110 is rotatably fastened to the drive mechanism 150. The one or more pairs of slip openings 157 are configured to receive the output fasteners 116 of the output member 110 from the slot openings 156 in response to an over torque condition at the rotatable drive plate 152. In particular, the slip openings 157 are sized and shaped to permit relative movement of the output fasteners 116 therein while minimizing rotation of the rotatable drive plate 152 such that the rotatable drive plate 152 is configured to slip circumferentially to a limited degree in instances where an over torque is applied to the drive mechanism 150. In this instance, the slip openings 157 are configured to relieve an over tension of the rotatable drive plate 152 of the drive mechanism 150. With the output fasteners 116 of the output member 110 coupled to the slot openings 156 of the rotatable drive plate 152, the elongated body 112 and the plurality of projections 114 of the output member 110 are configured to move (e.g. rotate) simultaneously with a movement (e.g. rotation) of the rotatable drive plate 152.

It should be understood that the rotatable drive plate 152 includes one or more slot openings 156 corresponding to a number of output fasteners 116 included on the output member 110. In the present example, the rotatable drive plate 152 includes a pair of slot openings 156 corresponding to the pair of output fasteners 116 included on the output member 110. It should further be understood that the mounting plate 102 disposed between the output member 110 and the drive mechanism 150 is fixedly secured relative to the elongated body 112 and the rotatable drive plate 152 such that the mounting plate 102 remains rotatably fixed during rotation of the output member 110 and/or the drive mechanism 150.

Still referring to FIG. 3, the drive mechanism 150 further includes at least one sensor 154. In the embodiment, the sensor 154 is coupled to the rotatable drive plate 152 such that the sensor 154 is configured to rotate about the central fastener 151 simultaneously with the rotatable drive plate 152. The sensor 154 is communicatively coupled to the electronic control unit 109 of the autonomous tensioner system 100, which may control the motor 108 based on the signal received from the sensor 154. The sensor 154 may comprise various sensing devices, such as, for example, an encoder, an accelerometer, a load cell, a position sensor, a transducer, a motion sensor, and/or the like. In the present example, the sensor 154 is operable to detect a force load applied thereto, and further operable to transmit an output signal indicative of the force load to the motor 108 and/or the electronic control unit 109. In some embodiments, the load applied onto the sensor 154 is indicative of a drive torque transferred to the drive mechanism 150 from the motor 108. In other embodiments, the load applied onto the sensor 154 is indicative of a force load applied to a conveyor belt scraper 15 from a conveyor belt 18 (see FIG. 7). The sensor 154 is operable to transmit data electrically via an output signal, such as, for example, through a wired connection, wireless connection (e.g., electromagnetic waves), and/or the like. As described in greater detail herein, the motor 108 is configured to receive said output signal from the sensor 154, such as from the electronic control unit 109, to generate a corresponding drive torque. It should be understood that with the sensor 154 secured to the rotatable drive plate 152, the sensor 154 is coupled to the output member 110 via the engagement of the output fasteners 116 to the rotatable drive plate 152.

In some embodiments, the sensor 154 is operable to detect and transmit data relating to, at least, a presence of motion detected at the output member 110, a degree of rotation of the output member 110, a rotational torque applied to the output member 110, a drive torque generated by the motor 108, and/or the like. As described in greater detail herein, data detected by the sensor 154 may include information indicative of a stage of wear of a conveyor belt scraper 15 (see FIG. 7), a remaining life expectancy of the conveyor belt scraper 15, and/or the like. In some embodiments, the sensor 154 is a position sensor that is configured to detect a degree of rotation of the output member 110 in response to rotation of the conveyor belt scraper 15. It should further be understood that in other embodiments the sensor 154 may be positioned along various other components of the autonomous tensioner system 100 other than those shown and described herein (i.e. the rotatable drive plate 152) without departing from the scope of the present disclosure. For example, in other embodiments the sensor 154 may be positioned and/or coupled to the output member 110, the gearing assembly 120, the motor 108, and/or any subcomponents of said components of the autonomous tensioner system 100. The drive mechanism 150 further includes a clearance slot 159 disposed along the rotatable drive plate 152 and positioned adjacent to the sensor 154. The clearance slot 159 is sized and shaped to receive a component of the gearing assembly 120 therein to rotatably couple the drive mechanism 150 to the gearing assembly 120, such as, for example, a key member 142 (see FIG. 5). Further, the central fastener 151 disposed through the rotatable drive plate 152 is configured to couple the drive mechanism 150 to the gearing assembly 120 by engaging a component of the gearing assembly 120, such as, for example, the key member 142.

Figure 4:
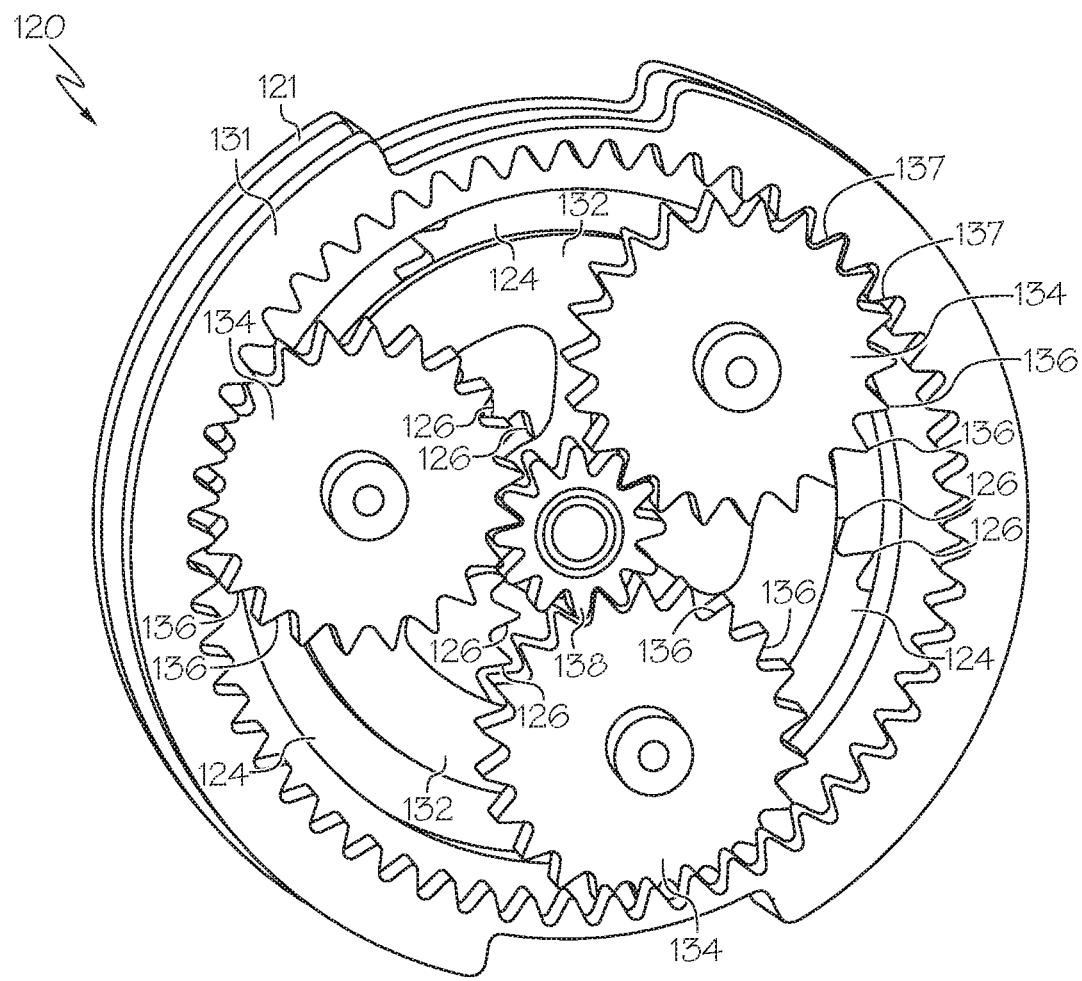
FIG. 4 schematically depicts a partial perspective view of the gearing assembly of the autonomous tensioner system of FIG. 1 according to one or more embodiments shown and described herein.

Referring now to FIG. 4, the second ring 131 of the gearing assembly 120 is schematically depicted. The second ring 131 includes a plurality of second outer gears 134 disposed within the second ring 131, and more specifically the plurality of second outer gears 134 are rotatably coupled to an interior surface of the second ring 131. Each of the plurality of second outer gears 134 includes a plurality of teeth 136 extending outwardly along a perimeter of the second outer gear 134. In other words, the plurality of teeth 136 of each of the plurality of second outer gears 134 define a toothed-surface extending about an exterior of the second outer gears 134. The second ring 131 of the gearing assembly 120 further includes a second central gear 138 disposed therein and coupled to each of the plurality of second outer gears 134. The second central gear 138 comprises a plurality of teeth extending about an exterior surface of the second central gear 138, which are sized and shaped to mesh with the plurality of teeth 136 of each of the plurality of second outer gears 134.

The second ring 131 of the gearing assembly 120 further includes a second periphery gear 137 formed along an interior surface of the second ring 131. More specifically, second periphery gear 137 of the second ring 131 includes a plurality of teeth extending inwardly along an interior surface of the second ring 131. In other words, the second periphery gear 137 defines a toothed-surface extending inwardly into the second ring 131 toward the plurality of second outer gears 134 positioned therein. Each of the plurality of second outer gears 134 is positioned relatively within the second periphery gear 137 and is rotatably coupled to the second periphery gear 137 via an engagement between the plurality of teeth 136 of each of the second outer gears 134 and the second periphery gear 137. The plurality of second outer gears 134 are configured to translate along the second periphery gear 137 of the second ring 131 and rotate within the second ring 131 in response to a rotation of the second central gear 138.

Still referring to FIG. 4, the central gear carrier 132 is securely coupled to the plurality of second outer gears 134 such that the central gear carrier 132 is configured to rotate relative to the first ring 121 and the second ring 131 in response to a rotation of the plurality of second outer gears 134 within the second ring 131. In some embodiments, the central gear carrier 132 is further coupled to the second central gear 138 of the second ring 131 such that the central gear carrier 132 is configured to rotate in response to a rotation of the second central gear 138. It should be understood that the central gear carrier 132 is coupled to the plurality of first outer gears 124 of the first ring 121 and the plurality of second outer gears 134 of the second ring 131 such that the central gear carrier 132 is configured to rotate in response to rotation of the plurality of outer gears 124, 134. The gearing assembly 120 includes a gearing ratio between the first ring 121 and the second ring 131 that is collectively configured to prevent a direct torque from driving the motor 108 in instances when the motor 108 is not actively energized. Additionally and/or alternatively, the one or more components positioned within the intermediate housing 107 of the autonomous tensioner system 100 may include a corresponding gearing ratio in conjunction with the gearing assembly 120. For example, in some embodiments the gearing ratio of the gearing assembly 120 and/or the intermediate housing 107 may exceed about 2,500 to 1, and in other embodiments the gearing ratio of the gearing assembly 120 may be about 3,600 to 1 or greater. The first ring 121 and the second ring 131 of the gearing assembly 120 are collectively configured to increase a first drive torque generated by the motor 108 and received at the first ring 121 to a second, greater drive torque outputted by the second ring 131 to the output member 110 due to the respective gearing ratios of the plurality of outer gears 124, 134 of the rings 121, 131.

Figure 5:
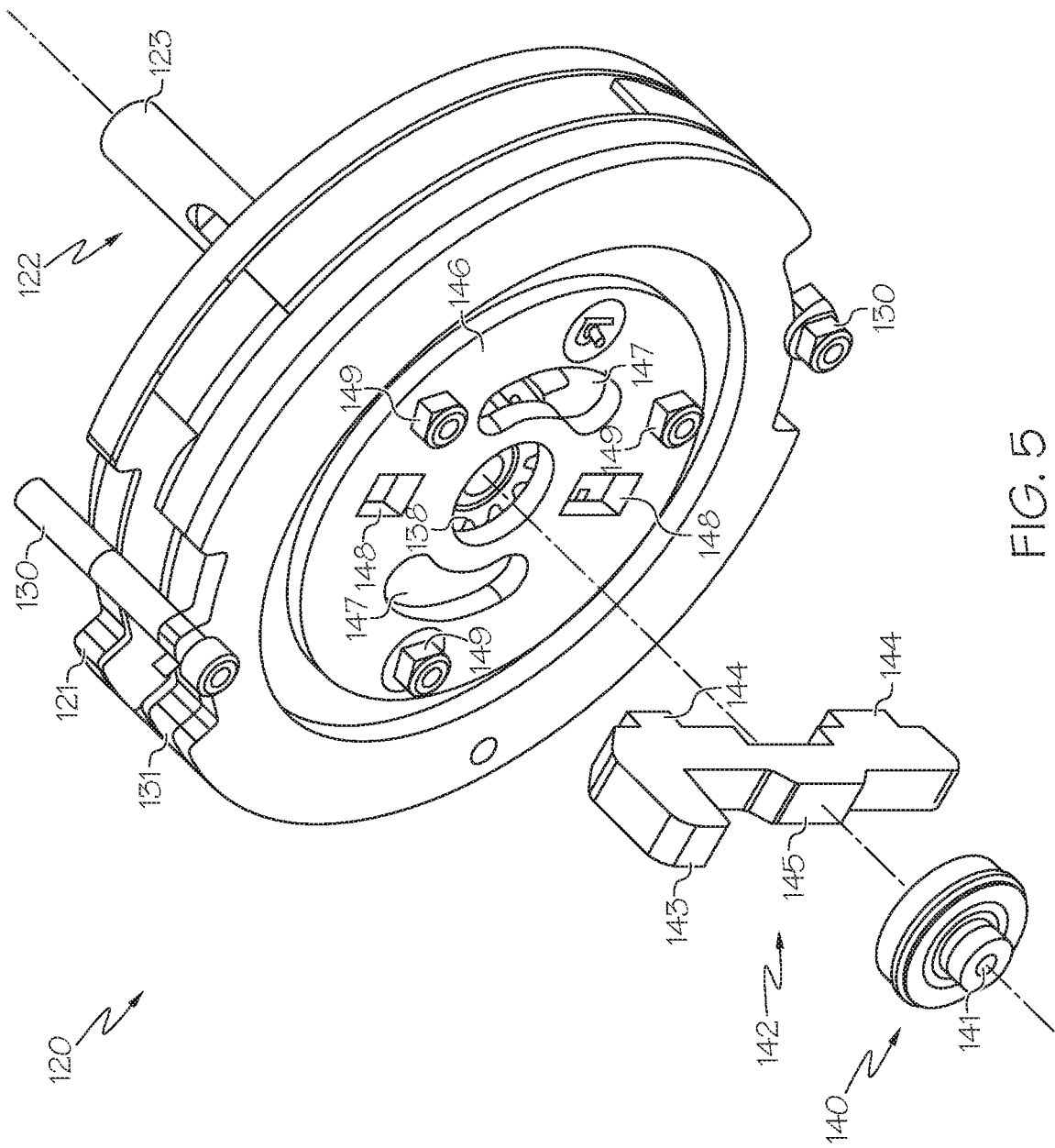
FIG. 5 schematically depicts a perspective view of the gearing assembly of the autonomous tensioner system of FIG. 1 including a key member according to one or more embodiments shown and described herein.

Referring now to FIG. 5, the gearing assembly 120 further includes an output plate 146 secured to the second ring 131 such that the output plate 146 encloses the plurality of second outer gears 134, the second periphery gear 137, and the second central gear 138 therein. The output plate 146 is further secured to each of the plurality of second outer gears 134 by one or more fasteners 149 extending therethrough. With the output plate 146 coupled to the plurality of second outer gears 134, and the plurality of second outer gears 134 rotatably coupled to the plurality of first outer gears 124 via the central gear carrier 132, the output plate 146 is configured to rotate in response to a rotation of the drive shaft 122 coupled to the plurality of first outer gears 124. The output plate 146 includes at least a pair of arcuate slots 147 and a pair of drive slots 148 formed thereon and disposed through the output plate 146. The pair of arcuate slots 147 are sized and shaped to receive the one or more output fasteners 116 of the output member 110 in response to the output fasteners 116 extending through the slot openings 156 of the rotatable drive plate 152 to thereby engage the gearing assembly 120 to the output member 110.

As briefly described above, the gearing assembly 120 is coupled to the drive mechanism 150 via a key member 142. In particular, the key member 142 of the gearing assembly 120 is coupled to the output plate 146 and includes a longitudinal body 145 with one or more fasteners 144 extending outwardly therefrom. The one or more fasteners 144 of the key member 142 are sized and shaped to extend through the drive slots 148 of the output plate 146 to couple the key member 142 thereto. In the present example, the key member 142 includes a pair of fasteners 144 extending outwardly from the longitudinal body 145 in a first direction. It should be understood that the key member 142 includes one or more fasteners 144 corresponding to a quantity of drive slots 148 included on the output plate 146. Additionally, the key member 142 includes a sensor tab 143 extending outwardly from the longitudinal body 145 in a second direction opposite the first direction. The sensor tab 143 is sized and shaped to extend through the clearance slot 159 of the rotatable drive plate 152 to thereby couple the key member 142 thereto. In this instance, the sensor tab 143 of the key member 142 engages the sensor 154 of the drive mechanism 150 positioned adjacent to the clearance slot 159. As described in greater detail herein, the key member 142 is configured to torsionally drive, and in particular rotate, the output member 110 in response to the sensor tab 143 engaging the clearance slot 159 and/or the sensor 154 of the rotatable drive plate 152.

Still referring to FIG. 5, the key member 142 of the gearing assembly 120 further includes a fastening mechanism 140 coupled to the longitudinal body 145 of the key member 142 such that the fastening mechanism 140 abuts against the longitudinal body 145 along a side opposite of the pair of fasteners 144. The fastening mechanism 140 includes a coupling interface 141 that is configured to engage the central fastener 151 to thereby couple the gearing assembly 120 to the drive mechanism 150. Accordingly, the key member 142 is configured to couple the drive mechanism 150 to the gearing assembly 120 via an engagement of the fasteners 144 with the pair of drive slots 148 of the gearing assembly 120, and the sensor tab 143 and the fastening mechanism 140 with the clearance slot 159 and the central fastener 151 of the drive mechanism 150, respectively.

Figure 6:
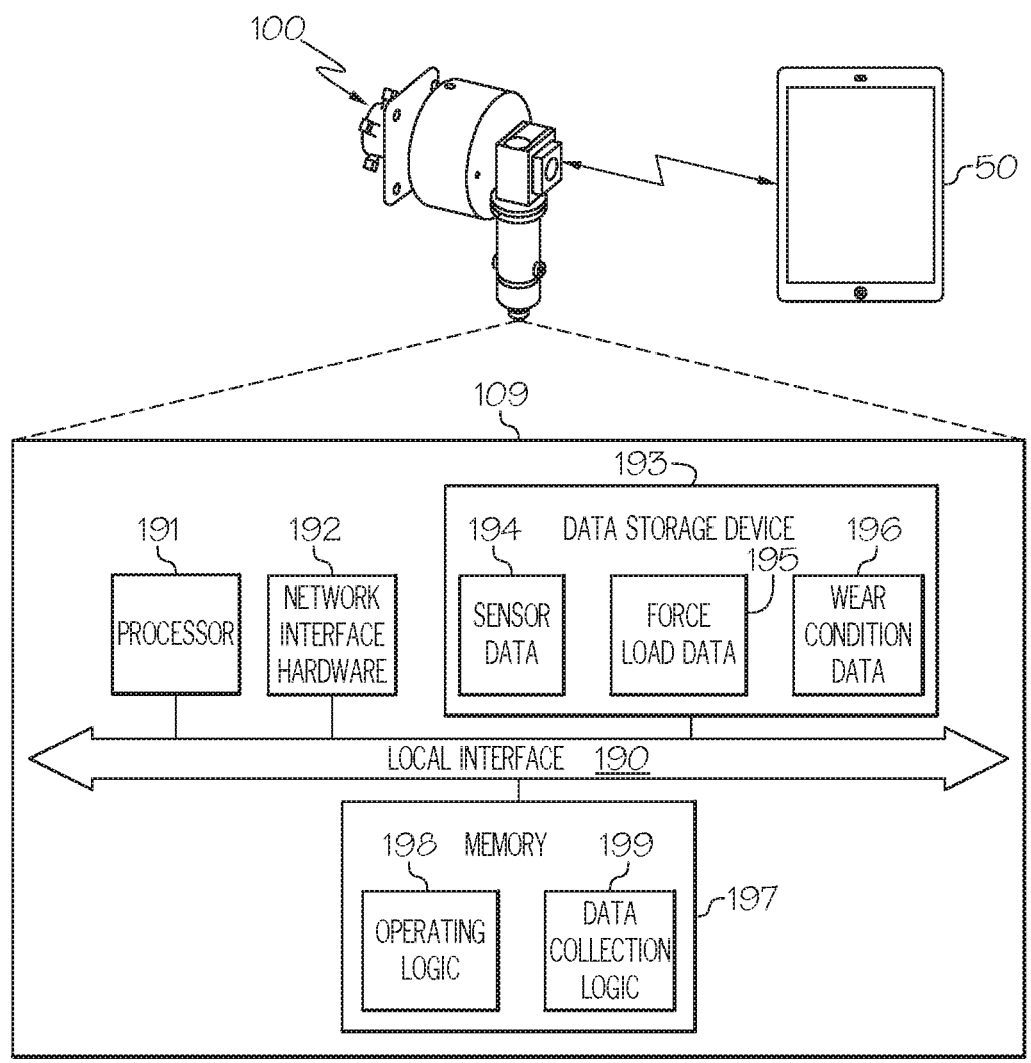
FIG. 6 schematically depicts illustrative hardware components of the autonomous tensioner system of FIG. 1 communicatively coupled to a remote device according to one or more embodiments shown and described herein.
Figure 7:
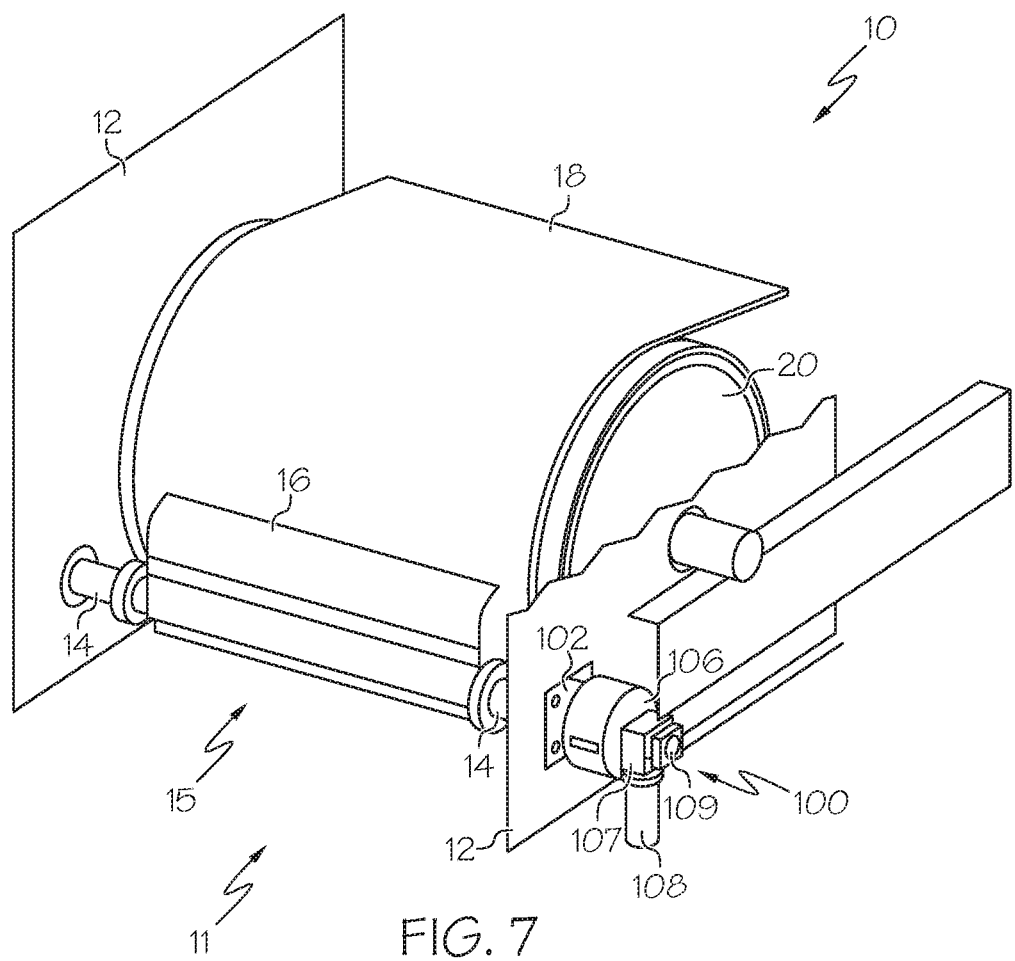
FIG. 7 schematically depicts the autonomous tensioner system of FIG. 1 coupled to a conveyor belt scraper that is secured to a conveyor belt assembly according to one or more embodiments shown and described herein.

FIG. 6 schematically depicts illustrative hardware components of the autonomous tensioner system 100 that may be integrated and used with various devices, such as, for example, a conveyor belt assembly 10 (see FIG. 7). In particular, the electronic control unit 109 of the autonomous tensioner system 100 may include a non-transitory computer-readable medium for completing the various processes described herein, embodied as hardware, software, and/or firmware, according to embodiments shown and described herein. The electronic control unit 109 may be an onboard computing system that is installed on the autonomous tensioner system 100 in some embodiments and may be a device separate from the autonomous tensioner system 100 in other embodiments. In some embodiments, the electronic control unit 109 may be a plurality of computing systems while in some embodiments the electronic control unit 109 may be configured as a general purpose computer with the requisite hardware, software, and/or firmware. In other embodiments the electronic control unit 109 may also be configured as a special purpose computer designed specifically for performing the functionality described herein. In embodiments where the electronic control unit 109 is a general purpose computer, the methods described herein provide a mechanism for improving the functionality of the autonomous tensioner system 100 by moving certain processor-intensive tasks away from the autonomous tensioner system 100 to be completed by an external device that is more adapted for such tasks.

The electronic control unit 109 of the autonomous tensioner system 100 may include, for example, a processor 191, network interface hardware 192 (i.e. communications module), a data storage device 193, and/or a non-transitory memory component 197. A local interface 190, such as a bus or the like, may interconnect the various components of the electronic control unit 109. The processor 191, such as a central processing unit (CPU), may be the central processing unit of the electronic control unit 109, performing calculations and logic operations to execute a program. The processor 191, alone or in conjunction with the other components, is an illustrative processor, computing device, processor, or combination thereof. The processor 191 may include any processing component configured to receive and execute instructions, such as, for example, from the data storage device 193, the non-transitory memory component 197, and/or a remote device 50.

Still referring to FIG. 6, the network interface hardware 192 is a communications module and may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 192 may provide a communications link between the electronic control unit 109 and one or more components of the autonomous tensioner system 100, such as, for example, the motor 108, the sensor 154, and/or the like. In some embodiments, the network interface hardware 192 may further provide communications between the electronic control unit 109 and one or more remote devices 50, such as, for example, a mobile device and/or tablet that is communicatively coupled to the autonomous tensioner system 100. The network interface hardware 192 of the electronic control unit 109 is operable to transmit electrical signals of data relating to the sensor 154 (e.g. sensor data 194, wear condition data 196, etc.) in response to the detection of data from the sensor 154, such as a drive torque generated by the motor 108 (e.g. a first drive torque), a drive torque generated by the gearing assembly 120 (e.g. a second drive torque), a rotational torque of the output member 110, a degree of rotation of the output member 110, and more.

In this instance, the processor 191 of the electronic control unit 109 executes transmission of the sensor data 194 to one or more components of the electronic control unit 109 and/or one or more remote devices 50 via the network interface hardware 192. In some embodiments, the network interface hardware 192 is further operable to transmit a signal to the motor 108 to initiate activation of the motor 108, or to one or more remote devices 50 to transmit an alert and/or notification, such as, for example, of a progressive wear of the conveyor belt scraper 15 (see FIG. 7), of a life expectancy of the conveyor belt scraper 15, and/or to replace the conveyor belt scraper 15. In this instance, the processor 191 of the electronic control unit 109 executes transmission of the signal to the one or more remote devices 50 via the network interface hardware 192 to relay information relating to the conveyor belt scraper 15.

The data storage device 193, which may generally be a storage medium, may contain one or more data repositories for storing data that is received and/or generated by the electronic control unit 109. The data storage device 193 may be any physical storage medium, including, but not limited to, a hard disk drive (HDD), memory module, removable storage, and/or the like. While the data storage device 193 is depicted as a local device, it should be understood that the data storage device 193 may be a remote storage device, such as, for example, a server computing device or the like. The data storage device 193 of the electronic control unit 109 may contain various types of data therein according to one or more embodiments shown and described herein. The data storage device 193 may include, for example, sensor data 194 that may include data detected by the sensor 154 of the autonomous tensioner system 100 during execution of one or more computer-readable instructions and/or control algorithms of the operating logic 198 and/or the data collection logic 199. As merely an illustrative example, the sensor data 194 may comprise data detected by the sensor 154 from the motor 108, a conveyor belt scraper 15 (see FIG. 7), data manually inputted by a user via the remote device 50, and/or the like. In some embodiments, the sensor data 194 is data detected by the sensor 154 indicative of a movement of the rotatable drive plate 152 and/or the output member 110, a rotational torque of the output member 110, a degree of rotation of the output member 110, a duration that the motor 108 is activated, and/or the like.

The data storage device 193 may further include, for example, force load data 195 including a data table of one or more force loads associated with a corresponding drive torque required to achieve a designated force load. In other words, the force load data 195 comprises a force load table that includes data indicative of necessary drive torques to generate particular force loads with the autonomous tensioner system 100. In some embodiments, the data storage device 193 may further include, for example, wear condition data 196 that may be indicative of a useful life of the conveyor belt scraper 15 (see FIG. 7), such as a maximum degree of physical adjustment (e.g. rotation) of the conveyor belt scraper 15. It should be understood that in other embodiments, the data storage device 193 of the electronic control unit 109 may include additional and/or fewer data than that depicted and described herein without departing from the scope of the present disclosure.

Still referring to FIG. 6, the non-transitory memory component 197 may be configured as a nonvolatile computer-readable medium and, as such, may include read only memory (ROM), flash memory, registers, compact discs (CD), digital versatile discs (DVD), and/or other types of storage components. The non-transitory memory component 197 may include one or more programming instructions and/or control algorithms thereon that, when executed by the processor 191, cause the processor 191 to complete various processes. For example, certain processes as described herein may include autonomously adjusting a conveyor belt scraper 15 by comparing a force load received thereon to the force load data 195 for determining whether to activate the motor 108 (see FIG. 8). The programming instructions and/or control algorithms stored on the non-transitory memory component 197 may be embodied as a plurality of software logic modules, where each logic module provides programming instructions for completing one or more tasks.

In some embodiments, the program instructions contained on the non-transitory memory component 197 may be embodied as a plurality of software modules, where each module provides programming instructions for completing one or more tasks. For example, FIG. 6 schematically depicts the non-transitory memory component 197 containing illustrative logic components according to one or more embodiments shown and described herein. The non-transitory memory component 197 may be configured to store various processing logic, such as, for example, operating logic 198 and/or data collection logic 199 (each of which may be embodied as a computer program, firmware, or hardware, as an example). The operating logic 198 may include an operating system and/or other control algorithm software for managing components of the autonomous tensioner system 100. As described in greater detail herein, the operating logic 198 of the electronic control unit 109 is configured to generate a drive torque via the motor 108 upon detecting a force load discrepancy (see FIG. 8), determine whether a useful life of a conveyor belt scraper 15 has elapsed (see FIG. 9), and/or compute a life expectancy of the conveyor belt scraper 15 (see FIG. 10). The data collection logic 199 may contain one or more software modules for collecting data (e.g., the sensor data 194) from one or more components of the autonomous tensioner system 100 (e.g., the sensor 154), converting data, transmitting data, and/or analyzing data, as described in greater detail herein.

Referring now to FIG. 7, a conveyor belt assembly 10 is depicted with the autonomous tensioner system 100 coupled thereto. The conveyor belt assembly 10 includes a conveyor belt pulley 20 rotatably coupled between a pair of support structures 12 with a conveyor belt 18 disposed thereon. The conveyor belt pulley 20 is positioned at a terminal end 11 of the conveyor belt assembly 10 to which the conveyor belt 18 extends about the conveyor belt pulley 20 and reverses a direction of travel. In some embodiments, the conveyor belt assembly 10 comprises a bulk material handling and processing apparatus configured to convey bulk material along the conveyor belt 18, such as, for example, ore, grain, and various other non-packaged bulk materials. It should be understood that the conveyor belt pulley 20 of the conveyor belt assembly 10 is configured to discharge the bulk material from the conveyor belt 18 at the terminal end 11.

The conveyor belt assembly 10 includes a conveyor belt scraper 15 at the terminal end 11 and positioned adjacent to the conveyor belt pulley 20. The conveyor belt scraper 15 includes a mainframe 14 extending between and coupled to the pair of support structures 12 at a position adjacent to the conveyor belt pulley 20. As will be described in greater detail herein, the mainframe 14 is movably coupled to the pair of support structures 12 such that the mainframe 14 is selectively movable (e.g. rotatable, pivotable, etc.) relative to the support structures 12. The conveyor belt scraper 15 further includes a scraper blade 16 coupled to and extending outwardly from the mainframe 14. With the conveyor belt scraper 15 positioned adjacent to the terminal end 11 and oriented toward the conveyor belt pulley 20, the scraper blade 16 of the conveyor belt scraper 15 is in engagement with a portion of the conveyor belt 18 disposed along the conveyor belt pulley 20. In particular, the scraper blade 16 extends from the mainframe 14 toward the conveyor belt pulley 20 and abuts against the conveyor belt 18 disposed thereon.

Still referring to FIG. 7, in the present example the conveyor belt scraper 15 is configured to engage bulk material disposed on the conveyor belt 18 at the terminal end 11 of the conveyor belt assembly 10 to reduce a carryback and/or spillage of bulk material during a return run of the conveyor belt 18. In other words, the scraper blade 16 of the conveyor belt scraper 15 is configured to remove bulk material positioned along the conveyor belt 18 by maintaining continuous engagement with the conveyor belt 18 to thereby scrape off any bulk material received thereon at the terminal end 11.

The autonomous tensioner system 100 is coupled to the conveyor belt assembly 10, and more specifically is securely attached to at least one of the pair of support structures 12. In the present example, the mounting plate 102 of the autonomous tensioner system 100 is securely attached to the support structure 12 at a position adjacent to the terminal end 11 of the conveyor belt assembly 10 such that the autonomous tensioner system 100 is installed in line with the conveyor belt scraper 15. With the mounting plate 102 of the autonomous tensioner system 100 secured to the conveyor belt assembly 10 and in positioned flush with the support structure 12, the housing 106, the motor 108, and the intermediate housing 107 are disposed external of the pair of support structures 12. The output member 110 of the autonomous tensioner system 100 extends through an aperture formed in the support structure 12 (not shown) and is thereby disposed between the pair of support structures 12.

Still referring to FIG. 7, the output member 110 of the autonomous tensioner system 100 is received in and coupled to the mainframe 14 of the conveyor belt scraper 15 such that the autonomous tensioner system 100 is communicatively coupled to the conveyor belt scraper 15. In this instance, the mainframe 14 of the conveyor belt scraper 15 is movable in response to a simultaneous movement (e.g. rotation) of the output member 110. Although not shown, it should be understood that the elongated body 112 of the output member 110 is sized and shaped to extend through the support structure 12 and be received within the mainframe 14 of the conveyor belt scraper 15. As described above, the plurality of projections 114 extending about the elongated body 112 are configured to engage an exterior surface and/or wall of the mainframe 14 when the elongated body 112 is received therein. With the elongated body 112 received around the mainframe 14 and the plurality of projections 114 engaged thereto, the output member 110 of the autonomous tensioner system 100 is securely coupled to the mainframe 14. In some embodiments, the plurality of projections 114 is resiliently biased in a laterally outward direction relative to the elongated body 112 to facilitate engagement with the mainframe 14 when disposed therein.

In this instance, rotation of the output member 110 relative to the mounting plate 102 provides for simultaneous movement (e.g. rotation, pivot, etc.) of the mainframe 14 and the scraper blade 16 relative to the conveyor belt 18 of the conveyor belt assembly 10. As described in greater detail herein, the autonomous tensioner system 100 is configured to bias the scraper blade 16 of the conveyor belt scraper 15 against the conveyor belt 18 of the conveyor belt assembly 10. In other embodiments, the autonomous tensioner system 100 may be configured in an opposite configuration than that shown and described herein such that the autonomous tensioner system 100 is coupled to the opposite support structure 12 of the conveyor belt assembly 10. Accordingly, it should be understood that the rotatable drive plate 152 of the drive mechanism 150 is reversible such that a drive torque applied thereto by the gearing assembly 120, and more specifically the key member 142, may be received in either rotational direction (e.g., clockwise, counterclockwise, etc.). In this instance, the autonomous tensioner system 100 is configured to be assembled onto the conveyor belt assembly 10 in various suitable configurations. Additionally, in some embodiments the conveyor belt scraper 15 and the autonomous tensioner system 100 may be positioned at various other locations of the conveyor belt assembly 10 other than at the terminal end 11 as shown and described herein without departing from the scope of the present disclosure.

Figure 8:
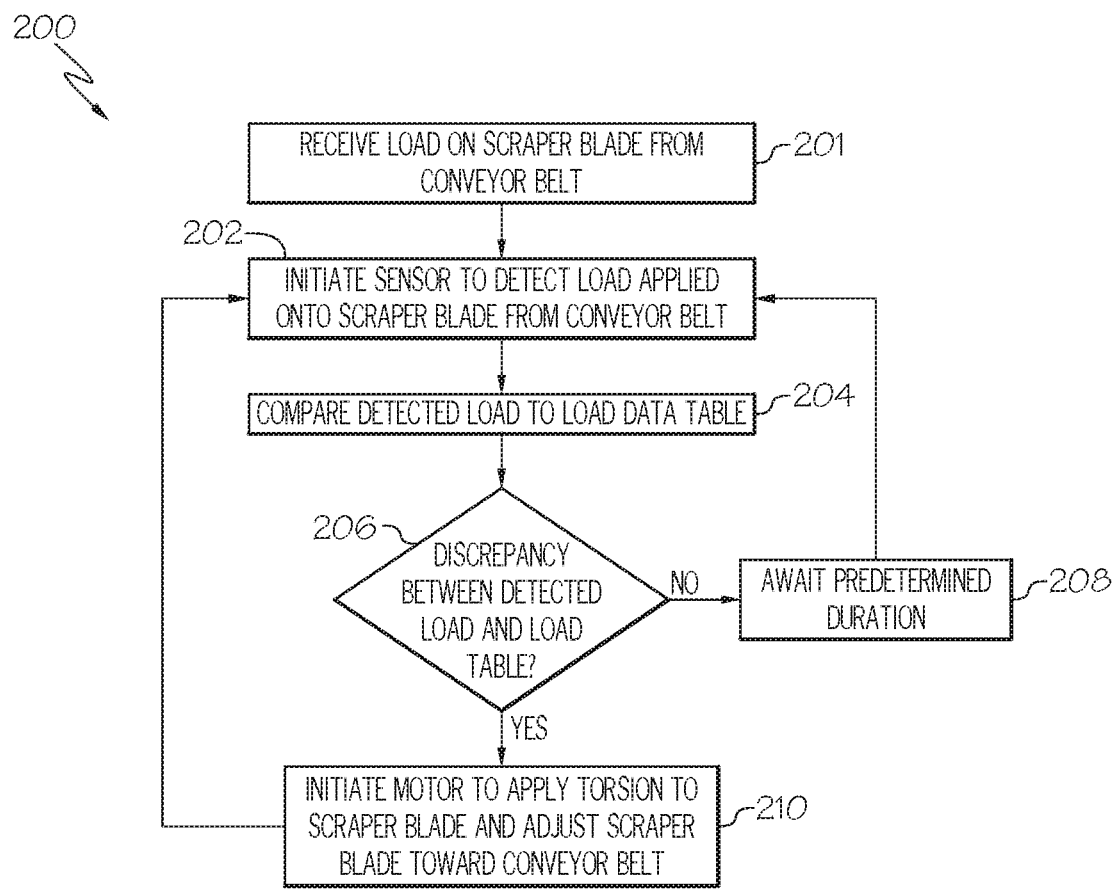
FIG. 8 depicts a flow diagram of an illustrative method of autonomously adjusting a conveyor belt scraper with the autonomous tensioner device of FIG. 1 according to one or more embodiments shown and described herein.

Referring now to the flow diagram of FIG. 8 in conjunction with FIGS. 1-7, an exemplary method 200 of autonomously adjusting a mechanical engagement between the conveyor belt scraper 15 and the conveyor belt 18 by the autonomous tensioner system 100 is schematically depicted. More specifically, the autonomous tensioner system 100 is operable to detect a load applied onto the conveyor belt scraper 15 by the conveyor belt 18 to determine whether adjustment of the conveyor belt scraper 15 is required. The depiction of FIG. 8 and the accompanying description below is not meant to limit the subject matter described herein or represent an exact description of how the autonomous tensioner system 100 provides periodic autonomous tensioning of the conveyor belt scraper 15 against the conveyor belt 18, but instead is meant to provide a simple schematic overview to illustrate the general monitoring of a wear and tear of the conveyor belt assembly 10 described herein.

Referring initially to FIG. 7, the autonomous tensioner system 100 is coupled to the conveyor belt assembly 10. In particular, the output member 110 of the autonomous tensioner system 100 is rotatably secured to the mainframe 14 of the conveyor belt scraper 15. Further, the mounting plate 102 of the autonomous tensioner system 100 is securely fastened to at least one of the support structures 12 of the conveyor belt assembly 10 by receiving one or more fasteners through the apertures 104 formed along the mounting plate 102. In this instance, the autonomous tensioner system 100 is secured to the conveyor belt assembly 10 and communicatively coupled to the conveyor belt scraper 15 during use of the conveyor belt assembly 10. It should be understood that the scraper blade 16 of the conveyor belt scraper 15 is engaged to the conveyor belt 18 of the conveyor belt assembly 10 such that the scraper blade 16 abuts against the conveyor belt 18 as the conveyor belt pulley 20 translates the conveyor belt 18 toward the terminal end 11 with material disposed thereon.

Referring specifically to FIG. 8, at step 201 a load is received on the conveyor belt scraper 15 from the conveyor belt 18 during use of the conveyor belt assembly 10. At step 202, the sensor 154 of the autonomous tensioner system 100 is initiated to activate detection of a force load(s) applied to the scraper blade 16 of the conveyor belt scraper 15 by the conveyor belt 18 during use of the conveyor belt assembly 10. In particular, as the conveyor belt assembly 10 is in use the conveyor belt 18 translates to the terminal end 11 and around the conveyor belt pulley 20 located adjacently thereto. With the conveyor belt scraper 15 coupled to the conveyor belt assembly 10 at the terminal end 11, the scraper blade 16 receives a force load(s) from contact with the conveyor belt 18. The sensor 154 detects a force load(s) applied to the scraper blade 16 via the output member 110 that is coupled to the mainframe 14 of the conveyor belt scraper 15. Accordingly, as the scraper blade 16 receives a force load thereon the load is transferred to the output member 110 via the mainframe 14 and received by the key member 142. In this instance, with the key member 142 positioned within the clearance slot 159 and engaged against the sensor 154, the sensor 154 detects the force load and transmits a signal indicative of said force load to the electronic control unit 109 for storage in the data storage device 193 as sensor data 194.

The electronic control unit 109 includes computer-readable instructions and/or control algorithms in the form of the operating logic 198 that determines an amount of power to generate at the motor 108 in response to the force load applied to the scraper blade 16. In particular, at step 204, the processor 191 of the electronic control unit 109 compares the force load detected by the sensor 154 (i.e. the sensor data 194) to the force load data table 195 stored on the data storage device 193. As described in greater detail above, the force load data 195 includes a plurality of predetermined force load values that are associated with a corresponding drive torque necessary to generate a particular force load at the scraper blade 16. At step 206, the electronic control unit 109 of the autonomous tensioner system 100 determines whether the force load detected by the sensor 154 (i.e. the sensor data 194) varies from a predetermined force load value, identified in the force load data 195, required for maintaining sufficient contact between the scraper blade 16 and the conveyor belt 18.

Still referring to FIG. 8, the electronic control unit 109 specifically determines whether there is a discrepancy between the measured force load applied to the scraper blade 16, stored as the sensor data 194 in the data storage device 193, and a programmed force load from the force load data table 195 that is indicative of an adequate engagement between the scraper blade 16 and the conveyor belt 18. In some embodiments, the electronic control unit 109 may analyze whether a discrepancy between a measured force load at the scraper blade 16 and a programmed force load from the force load data table exceeds a predetermined threshold to determine whether sufficient contact exists. Alternatively, in other embodiments the electronic control unit 109 may assess whether a measured force load applied to the scraper blade 16 is below a predetermined force load threshold stored in the force load data table 195 to determine if the scraper blade 16 is adequately engaged with the conveyor belt 18. In response to the electronic control unit 109 determining that a discrepancy between the measured force load and the programmed force load from the force load data table 195 is not present and/or does not exceed a predetermined threshold at step 206, the electronic control unit 109 proceeds to step 208 where the autonomous tensioner system 100 awaits a predetermined duration prior to proceeding to step 202 to reevaluate a force load applied to the scraper blade 16 of the conveyor belt scraper 15.

In this instance, the electronic control unit 109 awaits a preprogrammed time interval at step 208 prior to reinitiating the sensor 154 to redetect a current force load applied to the scraper blade 16 of the conveyor belt scraper 15 at step 202. For example, the data collection logic 199 executed by the electronic control unit 109 may comprise various time intervals for periodically detecting a force load via the sensor 154, such as second(s), minute(s), hour(s), etc. Accordingly, the autonomous tensioner system 100 periodically repeats the steps 202-208 described in detail above at predetermined time intervals until the electronic control unit 109 identifies a discrepancy between the force load detected by the sensor 154 (i.e. the sensor data 194) and the corresponding load of the force load table 195. In other words, the sensor 154 periodically detects a force load applied to the conveyor belt scraper 15 such that the motor 108 periodically outputs a necessary drive torque in response to the electronic control unit 109 determining the force load applied to the conveyor belt scraper 15 varies from and/or is below a predetermined threshold value relative to a required force load from the force load data table 195.

Still referring to FIG. 8, alternatively, in response to the electronic control unit 109 of the autonomous tensioner system 100 determining that a discrepancy between the measured force load applied to the scraper blade 16 and the programmed force load from the force load data table 195 is present, and/or does exceed a predetermined threshold at step 206, the electronic control unit 109 proceeds to step 210 where the motor 108 is initiated to apply a torsion to the scraper blade 16 of the conveyor belt scraper 15. In particular, the motor 108 is activated and a first drive torque is generated. The first drive torque comprises a corresponding amount of force required to move the scraper blade 16 against the conveyor belt 18 to achieve a programmed force load as determined by the electronic control unit 109 from the force load data table 195. The first drive torque is transmitted from the motor 108 to the gearing assembly 120 via the drive shaft 122 that is coupled to the motor 108. The drive shaft 122 is configured to rotate in response to receiving the first drive torque from the motor 108.

Referring back to FIGS. 2-5, in this instance a rotation of the drive shaft 122 provides a simultaneous rotation of the first central gear 129 and the plurality of first outer gears 124 of the first ring 121. With the first ring 121 movably coupled to the second ring 131 via the central gear carrier 132, rotation of the first central gear 129 and the plurality of first outer gears 124 provides a simultaneous rotation of the plurality of second outer gears 134 and the second central gear 138 of the second ring 131 via the central gear carrier 132. The gearing assembly 120 receives the first drive torque at the first ring 121 and outputs a second drive torque at the second ring 131 that is greater than the first drive torque. In this instance, the second drive torque is transmitted to the drive mechanism 150 via the engagement of the key member 142 with the rotatable drive plate 152. The second drive torque is thereby relayed to the output member 110 that is rotatably coupled to the rotatable drive plate 152. In some embodiments, the second drive torque is a rotational drive torque generated by the gearing assembly 120 and transmitted to the output member 110 via the drive mechanism 150. Accordingly, the output member 110 rotates in response to a rotation of the rotatable drive plate 152 and thereby transmits the rotational torque to the mainframe 14 to bias the scraper blade 16 of the conveyor belt scraper 15 against the conveyor belt 18. In other words, due to an engagement of the elongated body 112 and plurality of projections 114 with the mainframe 14 of the conveyor belt scraper 15, rotation of the output member 110 provides a rotational torque that is received by the conveyor belt scraper 15, thereby causing a movement (e.g. rotation, pivot, etc.) of the scraper blade 16 toward the conveyor belt 18.

As the motor 108 applies torsion to the scraper blade 16 at step 210, the sensor 154 of the drive mechanism 150 detects a subsequent force load applied by the conveyor belt 18 to the scraper blade 16 at step 202. In particular, as a result of the gradually increasing bias applied by the output member 110 to the scraper blade 16 the sensor 154 is initiated to detect an updated force load applied to the conveyor belt scraper 15 from an enhanced engagement of the scraper blade 16 against the conveyor belt 18 due to a rotation of the scraper blade 16 thereto. The sensor 154 transmits an output signal indicative of the new force load (i.e. the sensor data 194) to the electronic control unit 109 for comparison to the force load data table 195 at step 204. In instances where the discrepancy is no longer present and/or the force load applied to the scraper blade 16 (i.e. the sensor data 194) exceeds the predetermined threshold, the electronic control unit 109 deactivates the motor 108 to cease rotation of the output member 110 and movement of the conveyor belt scraper 15 toward the conveyor belt 18 when the measured load (e.g. the sensor data 194) is equal to the predetermined load value from the force load data 195.

In this instance, the method 200 repeats the steps described above to continuously and autonomously adjust the conveyor belt scraper 15 as necessary by torsionally biasing the scraper blade 16 against the conveyor belt 18 in response to detecting an inadequate force load relationship between the conveyor belt scraper 15 and the conveyor belt 18. Periodically executing a self-adjustment of the conveyor belt scraper 15 by the autonomous tensioner system 100 provides improved performance of the conveyor belt assembly 10 by ensuring sufficient contact between the scraper blade 16 and the conveyor belt 18 is maintained despite a gradual wear and tear of the conveyor belt scraper 15. Accordingly, the autonomous tensioner system 100 provides continuous maintenance of the conveyor belt scraper 15 to effectively remove any materials disposed on the conveyor belt assembly 10. In other words, as a material of the scraper blade 16 wears due to a continuous abrasion against the conveyor belt 18, an adjustment of the conveyor belt scraper 15 relative to the conveyor belt 18 ensures sufficient contact therebetween is preserved to effectively remove materials transported by the conveyor belt assembly 10.

Figure 9:
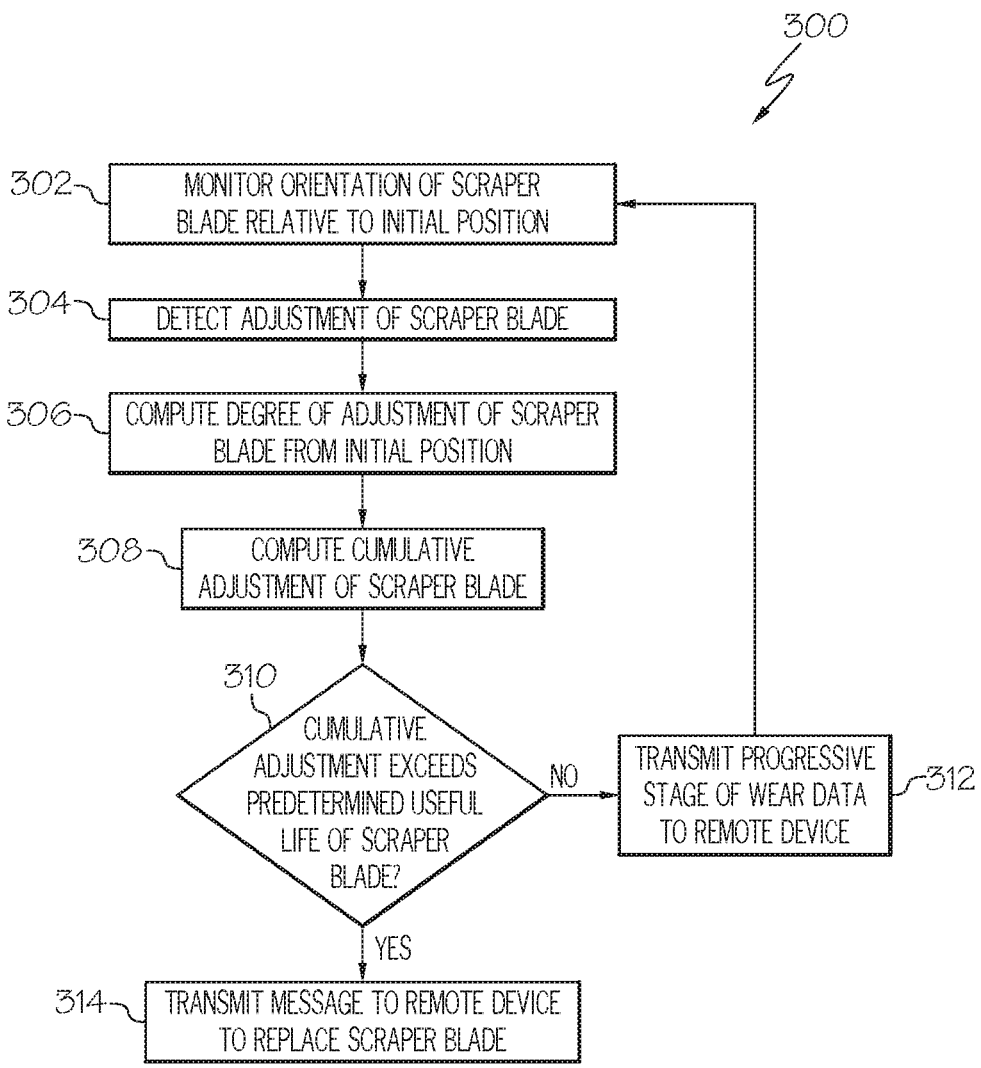
FIG. 9 depicts a flow diagram of an illustrative method of autonomously detecting a progressive wear of a conveyor belt scraper with the autonomous tensioner device of FIG. 1 according to one or more embodiments shown and described herein.

Referring now to the flow diagram of FIG. 9 in conjunction with FIGS. 1-7, an exemplary method 300 of autonomously measuring a useful life of the conveyor belt scraper 15 by the autonomous tensioner system 100 is schematically depicted. More specifically, the autonomous tensioner system 100 is operable to detect a cumulative rotation of the conveyor belt scraper 15 relative to an initial default position to determine whether replacement of the scraper blade 16 is required due to a gradual wear and tear during use of the conveyor belt assembly 10. As described with respect to the flow diagram of FIG. 8, the autonomous tensioner system 100 is configured to autonomously adjust an orientation and/or position of the scraper blade 16 relative to the conveyor belt 18 in response to determining that a force load relationship therebetween is insufficient. In other words, the autonomous tensioner system 100 is configured to progressively adjust an engagement of the scraper blade 16 against the conveyor belt 18 upon determining that contact between the scraper blade 16 and the conveyor belt 18 is inadequate to provide proper removal of materials disposed on the conveyor belt 18 by the scraper blade 16.

It should be understood that progressively adjusting a position and/or orientation of the scraper blade 16 against the conveyor belt 18 may provide for a gradual wear and tear of the scraper blade 16 due to the continuous engagement therebetween. Accordingly, a useful life of the conveyor belt scraper 15 is depleted as the conveyor belt assembly 10 is continuously utilized, thereby requiring replacement of the conveyor belt scraper 15 and/or the scraper blade 16. The depiction of FIG. 9 and the accompanying description below is not meant to limit the subject matter described herein or represent an exact description of how the autonomous tensioner system 100 provides periodic evaluation of a stage of wear of the conveyor belt scraper 15, but instead is meant to provide a simple schematic overview to illustrate the general monitoring of a wear and tear of the conveyor belt assembly 10 described herein.

Referring to FIG. 7, initially the autonomous tensioner system 100 is coupled to the conveyor belt assembly 10. More specifically, the scraper blade 16 is oriented relative to the conveyor belt 18 at an initial position that is detected and stored in the data storage device 193 by the sensor 154 as the sensor data 194. With the output member 110 of the autonomous tensioner system 100 rotatably coupled to the mainframe 14 of the conveyor belt scraper 15, and the mainframe 14 coupled to the scraper blade 16, the autonomous tensioner system 100 is configured to detect a change of orientation and/or position of the scraper blade 16 in response to a corresponding rotation of the output member 110. It should be understood that in the present embodiment the sensor 154 is a motion sensor and/or encoder configured and operable to identify motion of the scraper blade 16 by detecting a corresponding motion at one or more components of the autonomous tensioner system 100, such as the output member 110, the drive mechanism 150, the gearing assembly 120, the motor 108, and/or the like.

Referring now to FIG. 9, at step 302, the electronic control unit 109 monitors an orientation of the scraper blade 16 relative to the conveyor belt 18 from an initial position to an adjusted position in response to a progressive use of the conveyor belt assembly 10 and an autonomous adjustment of the scraper blade 16 by the autonomous tensioner system 100, as described above with respect to FIG. 8. In some embodiments, the sensor 154 (e.g., motion sensor, encoder, etc.) is configured to detect a relative orientation of the rotatable drive plate 152 to which the sensor 154 is coupled to. Accordingly, the sensor 154 detects an initial position and/or orientation of the rotatable drive plate 152, which is coupled to the conveyor belt scraper 15 via the output member 110, such that the sensor 154 correlates an orientation of the rotatable drive plate 152 to that of the scraper blade 16. Thus, the sensor 154 detects an initial position of scraper blade 16 of the conveyor belt scraper 15 and transmits said the sensor data 194 to the data storage device 193. As described above, it should be understood that the sensor 154 may be positioned and/or coupled to other components of the autonomous tensioner system 100 to monitor an orientation of the scraper blade 16, such as, for example, the motor 108. In this instance, the sensor 154 is configured to detect a rotation of the motor 108 such that a corresponding rotation of the rotatable drive plate 152 is calculated based on the sensor data 194 recorded by the sensor 154 at the motor 108.

At step 304, the sensor 154 detects a rotation of the rotatable drive plate 152 from an initial position to an adjusted position in response to the autonomous tensioner system 100 adjusting an orientation of the scraper blade 16 relative to the conveyor belt 18. With the rotatable drive plate 152 coupled to the output member 110, and the output member 110 coupled to the scraper blade 16 via the mainframe 14, the processor 191 of the electronic control unit 109 is configured to correlate a rotation of the rotatable drive plate 152 to a corresponding adjustment of the scraper blade 16 relative to the conveyor belt 18. At step 306, upon detecting the incremental adjustment of the scraper blade 16 at step 304, via the sensor data 194 transmitted to the electronic control unit 109 by the sensor 154, the electronic control unit 109 computes a degree of physical adjustment of the scraper blade 16 from the initial position detected by the sensor 154 at step 302. In other words, the electronic control unit 109 is configured to measure an orientation variance of the scraper blade 16 of the conveyor belt scraper 15 relative to an initial position of the scraper blade 16 at step 306.

Still referring to FIG. 9, at step 308 the electronic control unit 109 of the autonomous tensioner system 100 computes a cumulative degree of physical adjustment (e.g. rotation) of the scraper blade 16 including at least the incremental adjustment detected by the sensor 154 at step 304 and computed by the electronic control unit 109 at step 306. In other words, the electronic control unit 109 computes a cumulative rotation of the output member 110 from an initial, default position of the output member 110 to determine the corresponding cumulative degree of adjustment of the scraper blade 16. In this instance, the autonomous tensioner system 100 autonomously tracks and stores a progressive use of the conveyor belt scraper 15 during a lifetime of the conveyor belt scraper 15 by detecting and storing a plurality of readings from the sensor 154 in the data storage device 193 (i.e. the sensor data 194).

The electronic control unit 109 of the autonomous tensioner system 100 determines whether the cumulative adjustment of the scraper blade 16 exceeds a predetermined adjustment value of the scraper blade 16 that is indicative of a useful life of the conveyor belt scraper 15. In other words, the electronic control unit 109 is configured to determine whether the cumulative rotation of the output member 110 exceeds a predetermined rotational value. The data storage device 193 of the electronic control unit 109 includes wear condition data 196 that is indicative of a useful life of the scraper blade 16, such as a maximum degree of physical adjustment of the scraper blade 16 (i.e. a predetermined adjustment value) relative to an initial default position. Accordingly, the electronic control unit 109 is operable to associate a physical adjustment (i.e. a relative rotation and/or pivot in orientation) of the scraper blade 16 toward the conveyor belt 18 from an initial position to a remaining useful life of the conveyor belt scraper 15.

In response to determining that a cumulative adjustment of the scraper blade 16 does not exceed a predetermined adjustment value of the scraper blade 16 at step 310, the electronic control unit 109 of the autonomous tensioner system 100 transmits an electrical signal via the network interface hardware 192 to an operator, such as to the remote device 50, that is indicative of a progressive stage of wear of the scraper blade 16 at step 312. In other words, in response to determining that the cumulative rotation of the output member 110 does not exceed the predetermined rotation value from the wear condition data 196, the electronic control unit 109 transmits an electrical signal to the remote device 50 of a current state of the conveyor belt scraper 15 given the accumulated wear and tear of the scraper blade 16, at step 312. In other embodiments, the electronic control unit 109 of the autonomous tensioner system 100 is configured to transmit data of the progressive wear to the remote device 50 when an orientation variance of the scraper blade 16 does not exceed a predetermined threshold variance programmed in the wear condition data 196.

In particular, the progressive stage of wear data comprises an evaluation of a remaining useful life of the scraper blade 16 based on a comparison of the cumulative physical adjustment of the scraper blade 16, from an initial position, to a predetermined total physical adjustment degree that is indicative of a useful life of the scraper blade 16. In other embodiments, the progressive stage of wear is based on a number of revolutions of the motor 108 performed to physically adjust the scraper blade 16 relative to the conveyor belt 18 and/or an orientation variance of the output member 110 relative to an initial position, where cumulative rotational adjustments of the output member 110 are compared relative to a predetermined rotational threshold. Transmission of the progressive stage of wear may comprise various formats, including, for example, a total percentage of cumulative wear and tear of the scraper blade 16. An operator of the remote device 50 receives periodic notifications of a progressive wear and tear of the scraper blade 16 during each gradual adjustment of the scraper blade 16, as detected by the sensor 154 at steps 302 and 304. In this instance, the method 300 repeats the steps described above to continuously and autonomously monitor a current position of the scraper blade 16 and detect subsequent adjustments of the conveyor belt scraper 15 against the conveyor belt 18 for evaluating a current stage of wear of the conveyor belt scraper 15.

Still referring to FIG. 9, alternatively, in response to determining that a cumulative adjustment of the scraper blade 16 does exceed a predetermined useful life of the scraper blade 16 at step 310, as determined in reference to the wear condition data 196, the electronic control unit 109 transmits an electrical signal to the remote device 50 comprising a message and/or alert that a current stage of wear of the scraper blade 16 exceeds a useful life of the scraper blade 16 at step 314. In other embodiments, the electronic control unit 109 is configured to transmit the message to the remote device 50 when the orientation variance of the scraper blade 16 and/or output member 110 exceeds a predetermined threshold variance stored in the wear condition data 196. In either instance, the message transmitted to the remote device 50 may include a notification that replacement of the conveyor belt scraper 15 is required and/or that continued use of the conveyor belt scraper 15 is to be terminated. In other words, in response to determining that the cumulative rotation of the output member 110 exceeds the predetermined rotation value, the electronic control unit 109 is configured to transmit a notification to the remote device 50 that a useful life of the scraper blade 16 has expired such that the operation of the conveyor belt assembly 10 is to be ceased.

It should be understood that messages and/or alerts transmitted by the electronic control unit 109 to the remote device 50 at step 314 may comprise various other data and/or information than those shown and described herein without departing from the scope of the present disclosure. For example, the electronic control unit 109 may provide an evaluation of an estimated structural ability of the scraper blade 16 to remove materials disposed on the conveyor belt 18 based on a current state of the scraper blade 16. Periodically executing a self-estimation of a wear and tear of the conveyor belt scraper 15 by the autonomous tensioner system 100 provides improved performance of the conveyor belt assembly 10 by ensuring sufficient contact between the scraper blade 16 and the conveyor belt 18 is preserved. Providing notification when a gradual wear and tear of the conveyor belt scraper 15 exceeds a useful life of the conveyor belt scraper 15 facilitates a timely replacement of the conveyor belt scraper 15 to ensure an effective removal of materials disposed on the conveyor belt 18 is continuously maintained during use of the conveyor belt assembly 10.

Figure 10:
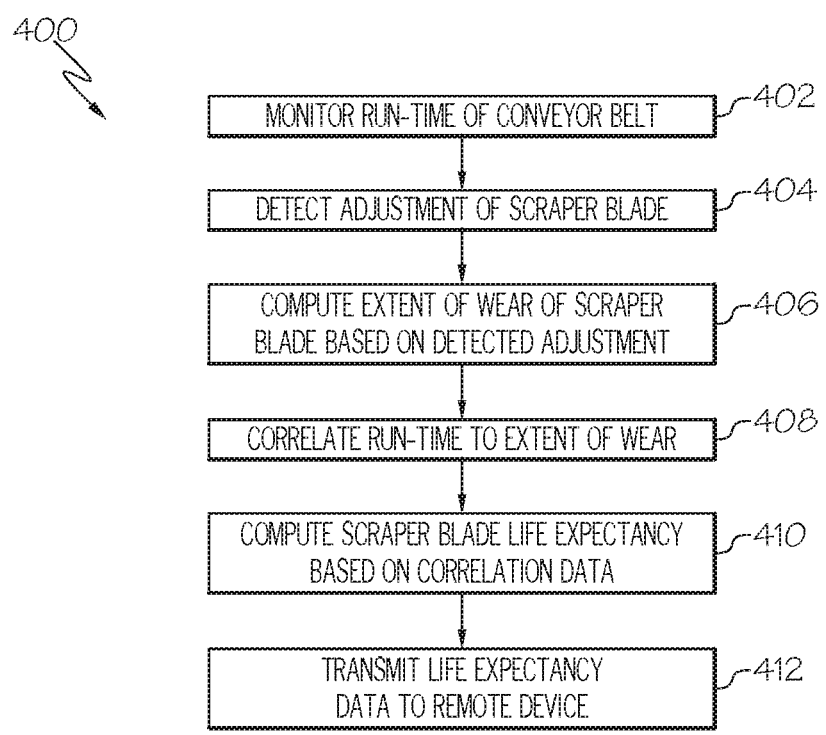
FIG. 10 depicts a flow diagram of an illustrative method of autonomously determining an expected useful life of a conveyor belt scraper with the autonomous tensioner device of FIG. 1 according to one or more embodiments shown and described herein.

Referring now to the flow diagram of FIG. 10 in conjunction with FIGS. 1-7, an exemplary method 400 of estimating a useful life expectancy of the conveyor belt scraper 15 by the autonomous tensioner system 100 is schematically depicted. More specifically, the autonomous tensioner system 100 is operable to detect a run-time of the conveyor belt assembly 10 and a corresponding adjustment of the conveyor belt scraper 15 during said run-time to determine a life expectancy of the scraper blade 16. As described with respect to the flow diagram of FIG. 8, the autonomous tensioner system 100 is configured to autonomously adjust a position of the scraper blade 16 in response to determining an inadequate contact with the conveyor belt 18. As further described with respect to FIG. 9, the autonomous tensioner system 100 is further configured to compute a progressive wear of the conveyor belt scraper 15 by measuring a cumulative adjustment of the scraper blade 16. A useful life of the conveyor belt scraper 15 may be estimated based on a degree of wear of the conveyor belt scraper 15 and a corresponding operation of the conveyor belt assembly 10 correlating to said wear. The depiction of FIG. 10 and the accompanying description below is not meant to limit the subject matter described herein or represent an exact description of how the autonomous tensioner system 100 calculates a useful life of the conveyor belt scraper 15, but instead is meant to provide a simple schematic overview to illustrate the general evaluation of a remaining life expectancy of the conveyor belt scraper 15 described herein.

Referring to FIG. 7, initially the autonomous tensioner system 100 is coupled to the conveyor belt assembly 10. With the output member 110 rotatably coupled to the mainframe 14, and the mainframe 14 coupled to the scraper blade 16 which is in continuous contact with the conveyor belt 18, the autonomous tensioner system 100 is configured to detect an active operation of the conveyor belt assembly 10 in response to a translation of the conveyor belt 18 against the conveyor belt scraper 15.

Referring now to FIG. 10, at step 402, the electronic control unit 109 monitors a run-time of the conveyor belt assembly 10 during activation of the conveyor belt 18, and in particular translation of the conveyor belt 18 about the conveyor belt pulley 20. In some embodiments, the sensor 154 is configured to detect a relative motion (e.g., vibration) of the rotatable drive plate 152 to monitor a run-time of the conveyor belt assembly 10. In particular, the sensor 154 detects movement of the rotatable drive plate 152, which is coupled to the conveyor belt scraper 15 via the output member 110, in response to the forces applied to the conveyor belt scraper 15 from the conveyor belt 18 during operation of the conveyor belt assembly 10. In this instance, the electronic control unit 109 monitors a run-time of the conveyor belt assembly 10 in response to the sensor 154 detecting relative movement at the rotatable drive plate 152 caused by a translation of the conveyor belt 18 against the conveyor belt scraper 15.

In other embodiments, the electronic control unit 109 may monitor a run-time of the conveyor belt assembly 10 by detecting an activation of the motor 108. In this instance, the electronic control unit 109 is configured to periodically monitor usage of the motor 108 such that activation of the motor 108 is correlated to a run-time of the conveyor belt assembly 10. It should be understood that a run-time of the conveyor belt assembly 10 may be detected and monitored by the sensor 154 via various other means than those shown and described herein without departing from a scope of the present disclosure. The electronic control unit 109 is configured to compute the active run-time of the conveyor belt assembly 10 until, for example, a lapse of a predetermined observation period, a cease of operation of the conveyor belt assembly 10, and/or the like. For example, a predetermined observation period stored within and executed by the electronic control unit 109 may comprise various suitable time intervals, such as, second(s), minute(s), hour(s), and/or the like.

Still referring to FIG. 10, at step 404 the sensor 154 detects a rotation of the rotatable drive plate 152 from an initial position to an adjusted position during the run-time of the conveyor belt assembly 10 (e.g., during the predetermined observation period). In this instance, the electronic control unit 109 is configured to correlate a rotation of the rotatable drive plate 152 to a corresponding adjustment of the scraper blade 16 of the conveyor belt scraper 15, due to a connection of the rotatable drive plate 152 to the conveyor belt scraper 15 via the output member 110. At step 406, upon detecting an incremental adjustment of the scraper blade 16 by the sensor 154 at step 404, the electronic control unit 109 computes a degree of physical adjustment of the scraper blade 16 from an initial position by measuring a rotation of the output member 110. In this instance, as described in greater detail above with respect to FIG. 9 at step 306, a stage of wear of the scraper blade 16 is computed by the electronic control unit 109 during the corresponding run-time of the conveyor belt assembly 10.

At step 408, the electronic control unit 109 correlates a run-time of the conveyor belt assembly 10 detected by the sensor 154 at step 402 (e.g., during a predetermined observation period) to the wear endured by the scraper blade 16 during the run-time computed by the electronic control unit 109 at step 406 to form representative correlation data. In other words, a run-time of the conveyor belt assembly 10 is associated with the corresponding extent of wear of the scraper blade 16 to determine a resultant relationship therebetween. At step 410, the electronic control unit 109 determines duration of life expectancy for the scraper blade 16 of the conveyor belt scraper 15 based on the resultant relationship (i.e. the correlation data) between the run-time of the conveyor belt assembly 10 and the stage of wear of the conveyor belt scraper 15 during said run-time.

Accordingly, the electronic control unit 109 is configured to determine a useful life of the conveyor belt scraper 15 by extrapolating the degree of wear of the scraper blade 16 to the active run-time of the conveyor belt assembly 10. In this instance, the electronic control unit 109 is operable to compute a remaining run-time that the existing conveyor belt scraper 15 may be capable of enduring to effectively remove materials disposed on the conveyor belt 18 until the scraper blade 16 experiences a wear and tear that exceeds a predetermined useful life. The electronic control unit 109 of the autonomous tensioner system 100 transmits an electrical signal to the remote device 50 comprising a message of an estimated life expectancy of the conveyor belt scraper 15 at step 412. In some embodiments, a message transmitted to the remote device 50 at step 412 may include a notification of when a replacement of the conveyor belt scraper 15 is determined to be required. In other words, in response to determining the remaining life expectancy of the scraper blade 16, the electronic control unit 109 is configured to transmit a notification to the remote device 50 of a remaining useful life of the scraper blade 16 via the network interface hardware 192.

The above-described system includes an autonomous tensioner coupled to a conveyor belt scraper that includes a motor that generates a first drive torque and a gearing assembly coupled to the motor such that the gearing assembly is actuated in response to the motor generating the first drive torque. The gearing assembly generates a second drive torque in response to receiving the first drive torque generated by the motor, where the second drive torque is greater than the first drive torque. The autonomous tensioner further includes an output member coupled to the gearing assembly and the conveyor belt scraper, where the output member receives the second drive torque from the gearing assembly and rotates in response, thereby generating a rotational torque. The conveyor belt scraper receives the rotational torque from the output member and simultaneously moves at a torque greater than the first drive torque initially generated by the motor. The autonomous tensioner provides a self-adjusting mechanism for torsionally biasing a conveyor belt scraper against a conveyor belt such that periodic manual inspection and tensioning of the conveyor belt scraper is not required to ensure that a proper biasing force is being applied. Further, the autonomous tensioner provides for maximizing a lifespan and performance of the conveyor belt scraper.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An autonomous tensioner system coupled to a conveyor belt scraper, comprising:
   a motor that generates a first drive torque;
   a gearing assembly coupled to the motor such that the gearing assembly is actuated in response to the motor generating the first drive torque, the gearing assembly generates a second drive torque in response to receiving the first drive torque generated by the motor, wherein the second drive torque is greater than the first drive torque;
   an output member coupled to the gearing assembly and the conveyor belt scraper, the output member receives the second drive torque from the gearing assembly and rotates in response, thereby generating a rotational torque;
   a processor; and
   a non-transitory computer-readable medium storing computer-readable instructions that, when executed by the processor, causes the processor to:
      determine whether a cumulative rotation of the output member exceeds a predetermined rotation value, and transmit at least one of:
         a termination notification to a remote device in response to determining the cumulative rotation exceeds the predetermined rotation value; and
         wear condition data of the conveyor belt scraper to the remote device in response to determining the cumulative rotation does not exceed the predetermined rotation value,
   wherein the conveyor belt scraper receives the rotational torque from the output member and simultaneously moves at a torque greater than the first drive torque generated by the motor.

2. The autonomous tensioner system of claim 1, further comprising a sensor coupled to the output member.

3. The autonomous tensioner system of claim 2, wherein the sensor is a load cell that detects a load applied to the conveyor belt scraper by a conveyor belt coupled thereto.

4. The autonomous tensioner system of claim 3, wherein the load cell periodically detects the load at a predetermined interval.

5. The autonomous tensioner system of claim 3, wherein the instructions, when executed by the processor, cause the processor to compare the load detected by the sensor to a predetermined load value.

6. The autonomous tensioner system of claim 5, wherein the instructions, when executed by the processor, cause the processor to determine whether the load detected by the sensors varies from the predetermined load value by a predetermined threshold.

7. The autonomous tensioner system of claim 6, wherein the instructions, when executed by the processor, cause the processor to transmit a signal to the motor indicative of the first drive torque such that the motor generates the first drive torque in response to receiving the signal.

8. The autonomous tensioner system of claim 2, wherein the sensor is an accelerometer that detects a rotation of the output member in response to movement of the conveyor belt scraper when the motor is inactive.

9. The autonomous tensioner system of claim 8, wherein the instructions, when executed by the processor, cause the processor to compute the cumulative rotation of the output member from an initial position of the output member.

10. The autonomous tensioner system of claim 9, wherein the instructions, when executed by the processor, cause the processor to:
    correlate the cumulative rotation of the output member to an active run-time of the conveyor belt scraper; and
    compute a life expectancy duration of the conveyor belt scraper based on the correlation.

11. An autonomous tensioner for a conveyor belt scraper coupled to a conveyor belt, comprising:
    a sensor that detects a load applied to the conveyor belt scraper by the conveyor belt;
    an electric motor that outputs a drive torque when the sensor detects the load applied to the conveyor belt scraper is below a predetermined value;
    a gearing assembly coupled to the electric motor such that the gearing assembly receives the drive torque from the electric motor, the gearing assembly outputs a rotational torque that is greater than the drive torque output by the electric motor;
    an output member rotatably coupled to the gearing assembly such that the output member receives the rotational torque from the gearing assembly, the output member outputs the rotational torque to the conveyor belt scraper, thereby causing the conveyor belt scraper to move at a torque greater than the drive torque output by the electric motor; and
    an electronic control unit configured to transmit at least one of:
       a termination message when rotation of the output member exceeds a predetermined rotation value corresponding to a useful life of the conveyor belt scraper; and
       wear condition data of the conveyor belt scraper when rotation of the output member does not exceed the predetermined rotation value corresponding to the useful life of the conveyor belt scraper.

12. The autonomous tensioner of claim 11, wherein the sensor periodically detects the load at a predetermined interval such that the electric motor periodically outputs the drive torque in response to the sensor detecting the load applied to the conveyor belt scraper is below the predetermined value.

13. The autonomous tensioner of claim 11, further comprising an encoder that detects a rotation of the output member in response to movement of the conveyor belt scraper while the electric motor is inactive.

14. A method of autonomously applying torsion to a conveyor belt scraper with a tensioner system, with the conveyor belt scraper coupled to a conveyor belt, the method comprising:
    detecting a load applied to the conveyor belt scraper from the conveyor belt with a sensor of the tensioner system;
    determining whether the load is equal to a predetermined load value;
    activating a motor of the tensioner system coupled to the conveyor belt scraper to move the conveyor belt scraper toward the conveyor belt when the load is not equal to the predetermined load value;
    deactivating the motor to cease movement of the conveyor belt scraper toward the conveyor belt when the load is equal to the predetermined load value;
    repeating the steps above at a predetermined interval; and
    transmitting at least one of:
       wear condition data when an orientation variance of the conveyor belt scraper does not exceed a predetermined threshold, and
       a termination message when the orientation variance exceeds the predetermined threshold.

15. The method of claim 14, further comprising:
measuring the orientation variance of the conveyor belt scraper relative to an initial position of the conveyor belt scraper.

16. The method of claim 14, further comprising:
measuring the orientation variance of the conveyor belt scraper relative to an initial position of the conveyor belt scraper; and
computing a degree of wear of the conveyor belt scraper based on the orientation variance of the conveyor belt scraper.

17. The method of claim 16, further comprising:
determining an active run-time of the conveyor belt; and
determining a useful life of the conveyor belt scraper by extrapolating the degree of wear of the conveyor belt scraper to the active run-time of the conveyor belt.

\* \* \* \* \*